US010437594B2

United States Patent
Eyole et al.

(10) Patent No.: US 10,437,594 B2
(45) Date of Patent: Oct. 8, 2019

(54) APPARATUS AND METHOD FOR TRANSFERRING A PLURALITY OF DATA STRUCTURES BETWEEN MEMORY AND ONE OR MORE VECTORS OF DATA ELEMENTS STORED IN A REGISTER BANK

(71) Applicant: ARM LIMITED, Cherry Hinton, Cambridge (GB)

(72) Inventors: Mbou Eyole, Soham (GB); Matthias Lothar Boettcher, Cambridge (GB)

(73) Assignee: ARM Limited, Cambridge (GB)

( * ) Notice: Subject to any disclaimer, the term of this patent is extended or adjusted under 35 U.S.C. 154(b) by 75 days.

(21) Appl. No.: 15/746,559

(22) PCT Filed: Jun. 15, 2016

(86) PCT No.: PCT/GB2016/051769
§ 371 (c)(1),
(2) Date: Jan. 22, 2018

(87) PCT Pub. No.: WO2017/021676
PCT Pub. Date: Feb. 9, 2017

(65) Prior Publication Data
US 2018/0217840 A1  Aug. 2, 2018

(30) Foreign Application Priority Data
Jul. 31, 2015  (GB) .................................. 1513498.4

(51) Int. Cl.
*G06F 9/30* (2018.01)
*G06F 9/38* (2018.01)
(Continued)

(52) U.S. Cl.
CPC ........ *G06F 9/30098* (2013.01); *G06F 3/0611* (2013.01); *G06F 3/0647* (2013.01);
(Continued)

(58) Field of Classification Search
None
See application file for complete search history.

(56) References Cited

U.S. PATENT DOCUMENTS 5,805,789 A * 9/1998 Huott .................. G06F 11/2294
714/6.32
5,887,183 A    3/1999 Agarwal et al.
(Continued)

FOREIGN PATENT DOCUMENTS

EP        0 135 721       4/1985
WO    WO 2005/057406     6/2005

OTHER PUBLICATIONS

International Search Report for PCT/G2016/051769, dated Sep. 30, 2016, 11 pages.
(Continued)

*Primary Examiner* — Eric Coleman
(74) *Attorney, Agent, or Firm* — Nixon & Vanderhye P.C.

(57) ABSTRACT

An apparatus and method are provided for transferring a plurality of data structures from memory into one or more vectors of data elements stored in a register bank. The apparatus has first interface circuitry to receive data structures retrieved from memory, where each data structure has an associated identifier and comprises N data elements. Multi-axial buffer circuitry is provided having an array of storage elements, where along a first axis the array is organized as N sets of storage elements, each set containing a plurality VL of storage elements, and where along a second axis the array is organized as groups of N storage elements, with each group containing a storage element from each of the N sets. Access control circuitry then stores the N data elements of a received data structure in one of the groups selected in dependence on the associated identifier. Responsive to an indication that all required data structures have been stored in the multi-axial buffer circuitry, second inter-
(Continued)

face circuitry then outputs the data elements stored in one or more of the sets of storage elements as one or more corresponding vectors of data elements for storage in a register bank, each vector containing VL data elements. Such an approach can significantly increase the performance of handling such load operations, and give rise to potential energy savings.

26 Claims, 15 Drawing Sheets

(51) Int. Cl.
*G06F 3/06* (2006.01)
*G06F 15/80* (2006.01)

(52) U.S. Cl.
CPC .......... *G06F 3/0656* (2013.01); *G06F 3/0683* (2013.01); *G06F 9/30018* (2013.01); *G06F 9/30036* (2013.01); *G06F 9/30043* (2013.01); *G06F 9/30145* (2013.01); *G06F 9/3824* (2013.01); *G06F 15/8061* (2013.01); *G06F 15/8076* (2013.01)

(56) References Cited

U.S. PATENT DOCUMENTS

| | | | | |
|---|---|---|---|---|
| 7,343,572 | B1* | 3/2008 | Stone | G06F 17/5022 703/14 |
| 7,856,246 | B2* | 12/2010 | Forsell | G06F 9/5066 455/552.1 |
| 2002/0198911 | A1 | 12/2002 | Blomgren et al. | |
| 2004/0078554 | A1* | 4/2004 | Glossner, III | G06F 9/345 712/220 |
| 2005/0018519 | A1* | 1/2005 | Nii | G11C 11/417 365/227 |
| 2005/0219422 | A1* | 10/2005 | Dorojevets | G06F 9/30014 348/719 |
| 2007/0150697 | A1* | 6/2007 | Sachs | G06F 9/30014 712/2 |
| 2010/0195362 | A1* | 8/2010 | Norman | G11C 7/1075 365/51 |
| 2015/0100754 | A1* | 4/2015 | Reid | G06F 9/30098 712/6 |

OTHER PUBLICATIONS

Combined Search and Examination Report for GB1513498.4, dated Mar. 18, 2016, 5 pages.

* cited by examiner

Register layout terminology:
$VL_{32}=4$  $VL_{64}=2$  $VL_{64/2}=4$
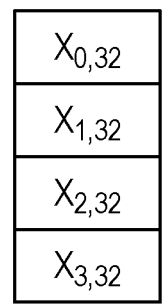
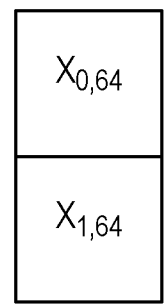
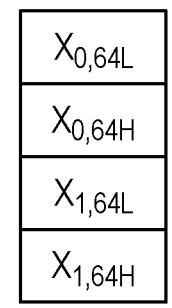
FIG. 9

Fault Handling for Speculative Loads
No fault during operation:

| Decode | L1D access | Alignment / Hit Logic | StructLoad Buffer (write) | MAB (drain; "All Done") | Commit |
|---|---|---|---|---|---|
| - Split into VL * load<n*type><br>- Discard load[i], if $P_g[i] == 0$<br><br>MAB:<br>- Allocate Zone<br>-- write IDs and corresponding uOps<br>-- write predicate $P_g$<br>-- write destinations $Z_d$ (optional) | $Id_0$ | $Id_0$<br>- Align to result bus<br>- Set WritePredicate | $Id_0$<br>- Write column identified by ID of $Id_0$<br>- respect WritePredicate | $Z_{d,0}$<br>- Write row to dest. register<br>- Insert 0s based on predicate | Commit the Load<br>Free the MAB<br>(As MAB includes speculative state, need to wait until all uOps done) |
| | $Id_1$ | $Id_1$ | $Id_1$ | $Z_{d,1}$ | |
| | $Id_2$ | $Id_2$ | $Id_2$ | ... | |
| | ... | ... | ... | $Z_{d,n-1}$ | |
| | $Id_{VL-1}$ | $Id_{VL-1}$ | $Id_{VL-1}$ | | |

FIG. 14A

Break at "Speculative Fault":

| Decode | L1D access | Alignment / Hit Logic | StructLoad Buffer (write) | MAB (drain; "All Done") | Commit |
|---|---|---|---|---|---|
| No change | No change | No change | No change | No change | No change |
| | $Id_1$ -- Fault | $Id_1$ -- Ignore | $Id_1$<br>- update Predicate | | |
| | ... | ... | | | |

- remaining loads may not be issued
- even if issued, ignore results

FIG. 14B

APPARATUS AND METHOD FOR TRANSFERRING A PLURALITY OF DATA STRUCTURES BETWEEN MEMORY AND ONE OR MORE VECTORS OF DATA ELEMENTS STORED IN A REGISTER BANK

This application is the U.S. national phase of International Application No. PCT/GB2016/051769 filed 15 Jun. 2016 which designated the U.S. and claims priority to GB Patent Application No. 1513498.4 filed 31 Jul. 2015, the entire contents of each of which are hereby incorporated by reference.

The present technique relates to an apparatus and method for transferring a plurality of data structures between memory and one or more vectors of data elements stored in a register bank.

One known technique for improving performance of a data processing apparatus is to provide circuitry to support execution of vector operations. Vector operations are performed on at least one vector operand, where each vector operand comprises a plurality of data elements. Performance of the vector operation then involves applying an operation repetitively across the various data elements within the vector operand(s).

Vector processing circuitry (often referred to as SIMD (Single Instruction Multiple Data) processing circuitry) may be used to provide multiple lanes of parallel processing in order to perform operations in parallel on the various data elements within the vector operands.

Although the use of such vector operations can result in significant performance benefits, a problem that arises is how to efficiently move the data elements required for the vector operations between memory and registers of a register file used to store the vector operands. In particular, the individual data elements required may be stored within a series of data structures within memory, where each data structure may include multiple related data elements, for example X, Y and Z coordinate values, red, green and blue pixel values, real and imaginary parts of complex numbers, etc. Hence, considering the example of seeking to load a series of data elements of a particular type (for example a series of X coordinate values) to form a desired vector operand of data elements for storage in the register file, it will be appreciated that a significant number of assesses to memory and/or the register bank will typically be required in order to gather the required data elements within a desired vector register.

It would be desirable to provide a technique that improves the performance of such access operations.

In one example configuration of the present technique, there is provided an apparatus, comprising: first interface circuitry to receive data structures retrieved from memory, each data structure having an associated identifier and comprising N data elements; multi-axial buffer circuitry having an array of storage elements, along a first axis the array being organised as N sets of storage elements, each set containing a plurality VL of storage elements, and along a second axis the array being organised as groups of N storage elements, each group containing a storage element from each of the N sets; access control circuitry to store the N data elements of a received data structure in one of said groups selected in dependence on the associated identifier; and second interface circuitry, responsive to an indication that required data structures have been stored in the multi-axial buffer circuitry, to output the data elements stored in one or more of the sets of storage elements as one or more corresponding vectors of data elements for storage in a register bank, each vector containing VL data elements.

In another example configuration, there is provided a method of transferring a plurality of data structures from memory into one or more vectors of data elements stored in a register bank, comprising: retrieving the data structures from the memory, each data structure having an associated identifier and comprising N data elements; providing an array of storage elements within a buffer, along a first axis the array being organised as N sets of storage elements, each set containing a plurality VL of storage elements, and along a second axis the array being organised as groups of N storage elements, each group containing a storage element from each of the N sets; storing the N data elements of each retrieved data structure in one of said groups selected in dependence on the associated identifier; and responsive to an indication that required data structures have been stored in the buffer, outputting the data elements stored in one or more of the sets of storage elements as one or more corresponding vectors of data elements for storage in the register bank, each vector containing VL data elements.

In a yet further example configuration there is provided an apparatus, comprising: first interface means for receiving data structures retrieved from memory, each data structure having an associated identifier and comprising N data elements; multi-axial buffer means having an array of storage element means, along a first axis the array being organised as N sets of storage element means, each set containing a plurality VL of storage element means, and along a second axis the array being organised as groups of N storage element means, each group containing a storage element means from each of the N sets; access control means for storing the N data elements of a received data structure in one of said groups selected in dependence on the associated identifier; and second interface means for outputting, responsive to an indication that required data structures have been stored in the multi-axial buffer means, the data elements stored in one or more of the sets of storage element means as one or more corresponding vectors of data elements for storage in a register bank means, each vector containing VL data elements.

The present technique will be described further, by way of example only, with reference to embodiments thereof as illustrated in the accompanying drawings, in which.

Figure 6:
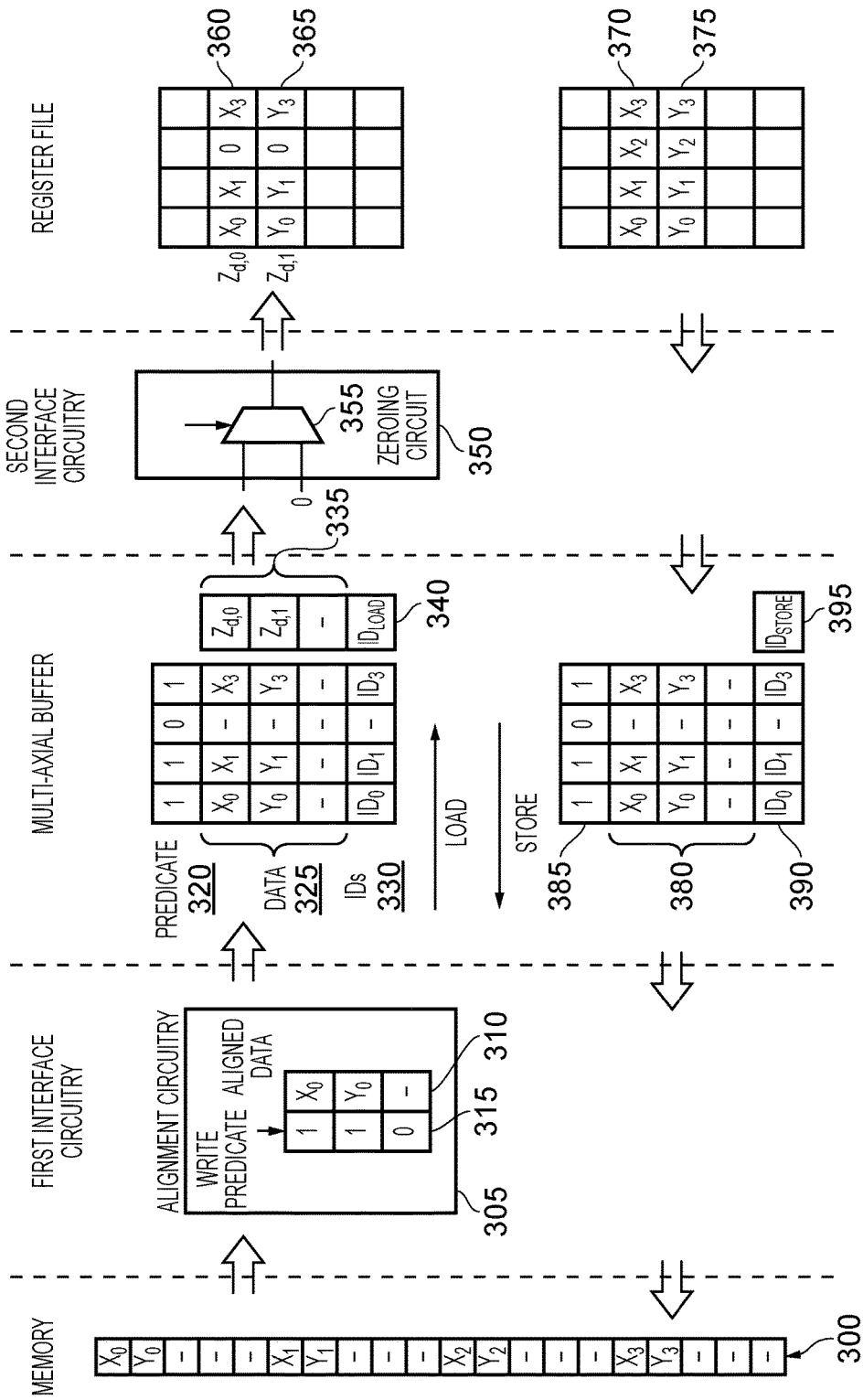
Figure 7:
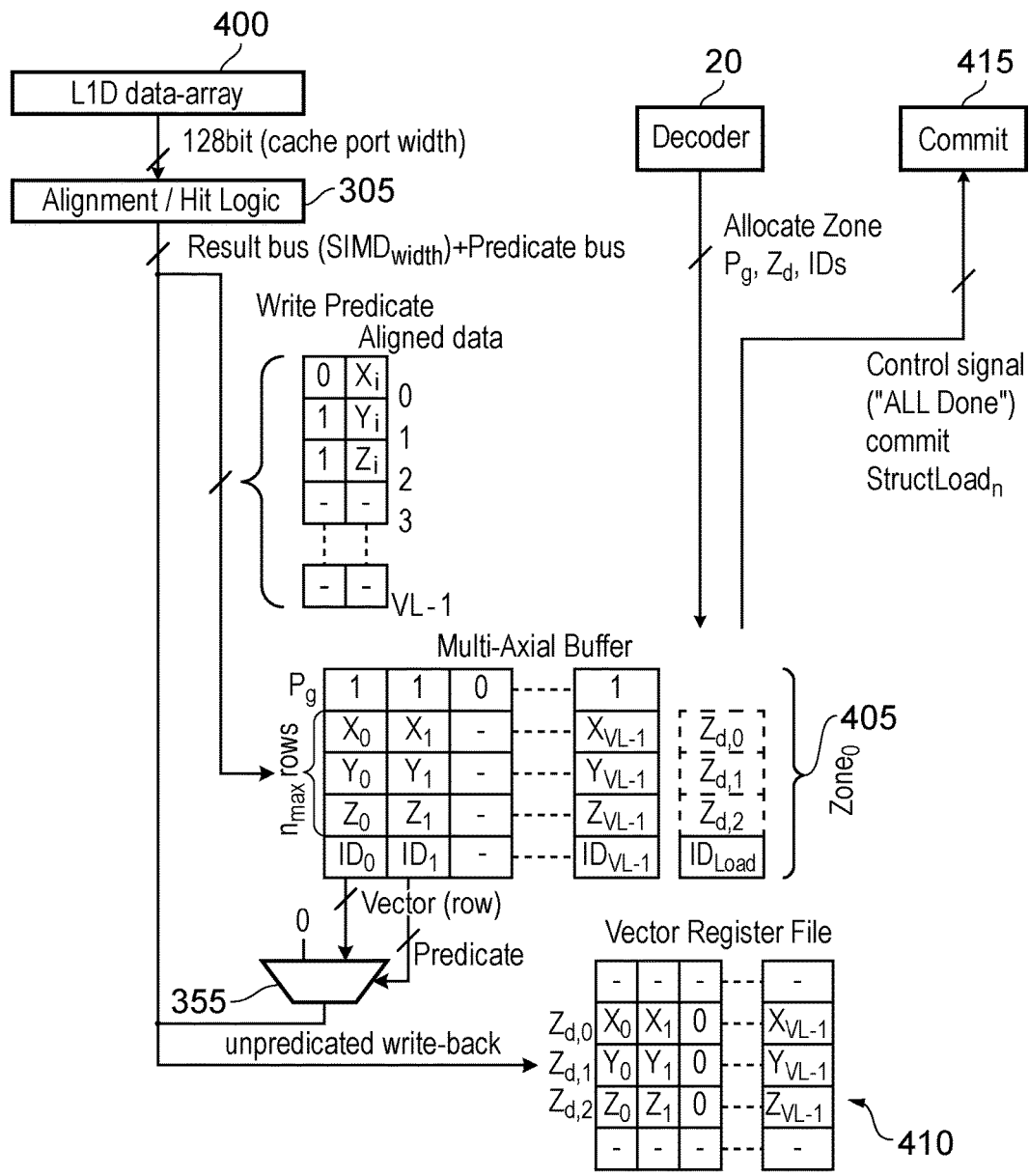
Figure 8:
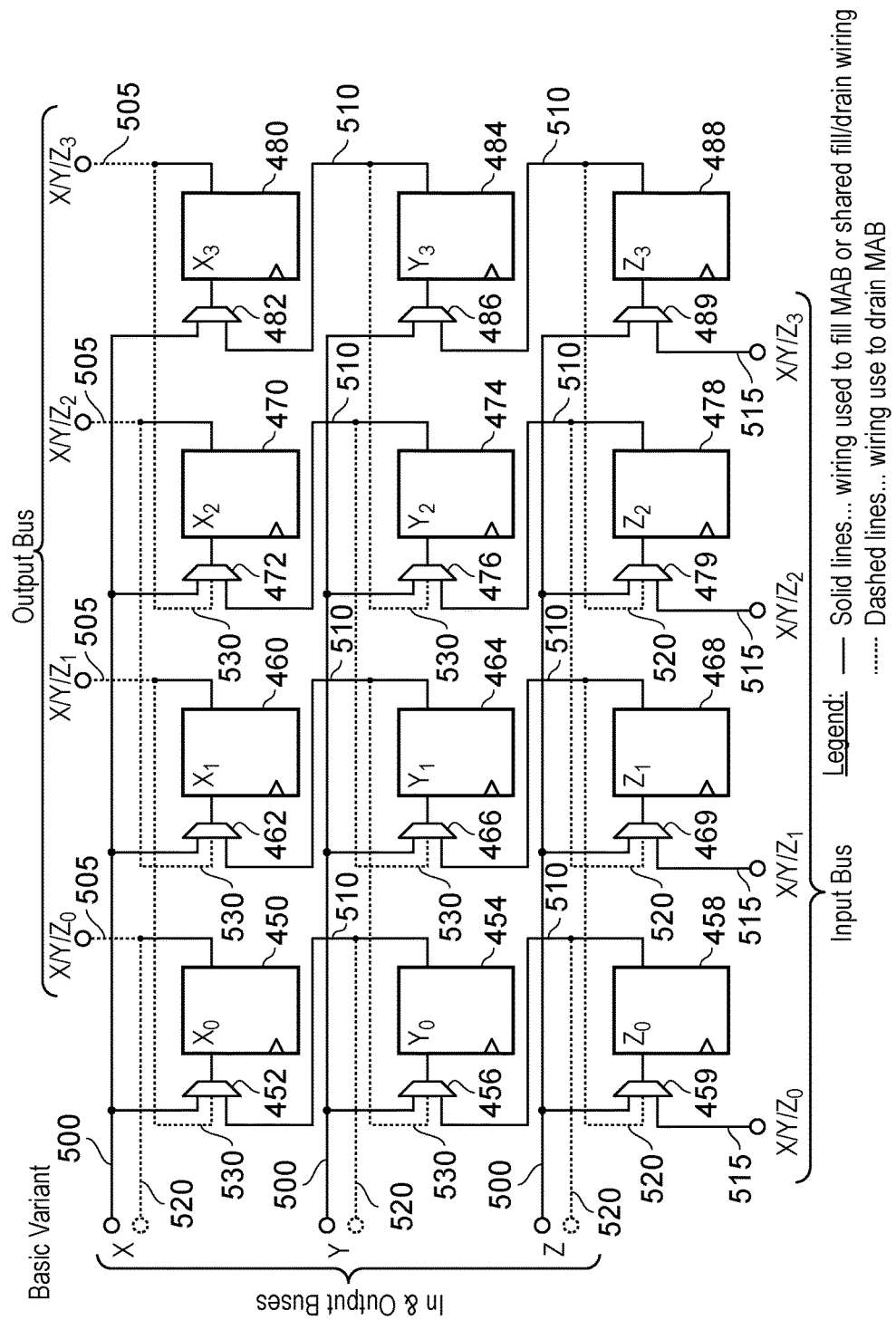
Figure 10:
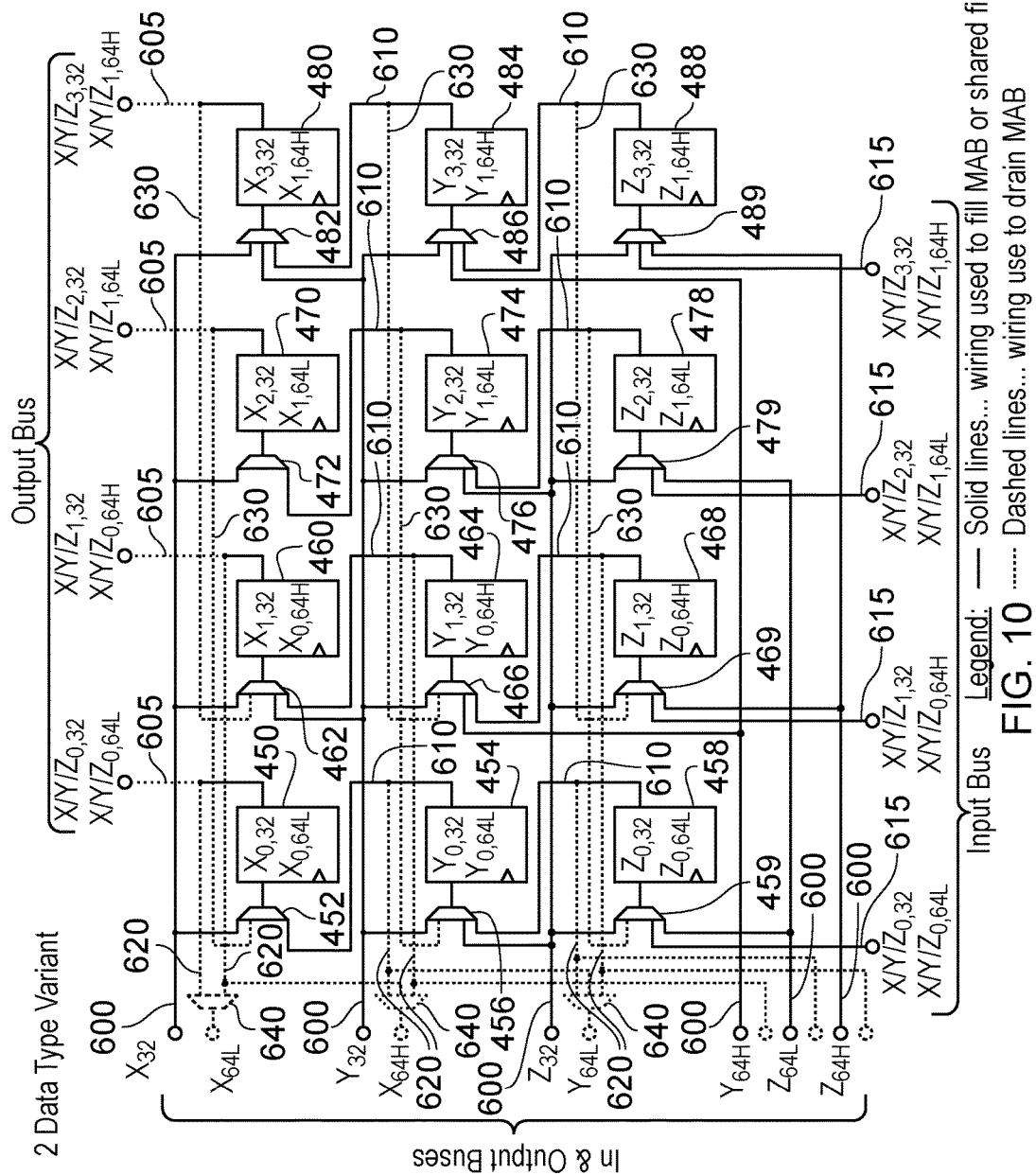
Figure 11:
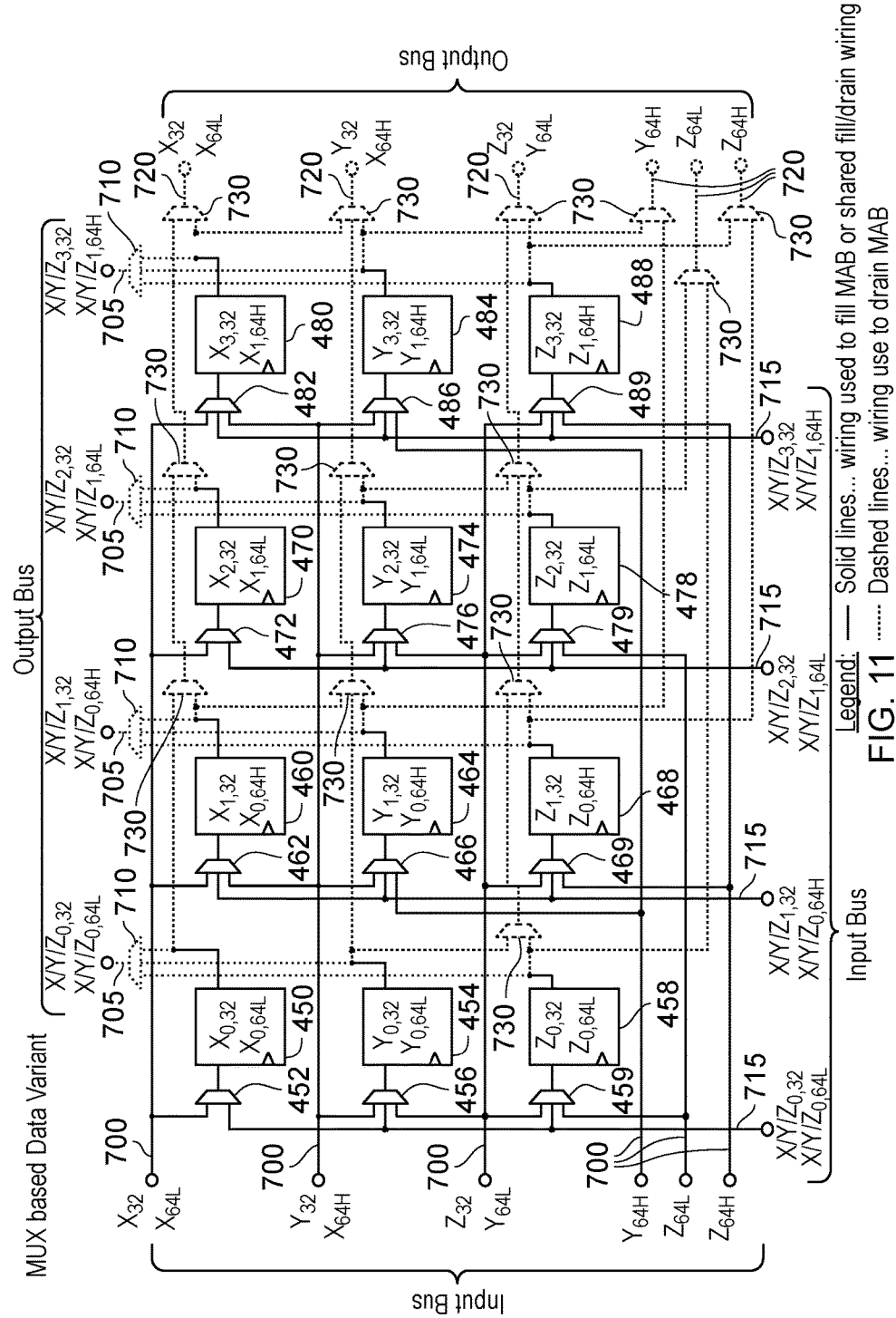
Figure 12:
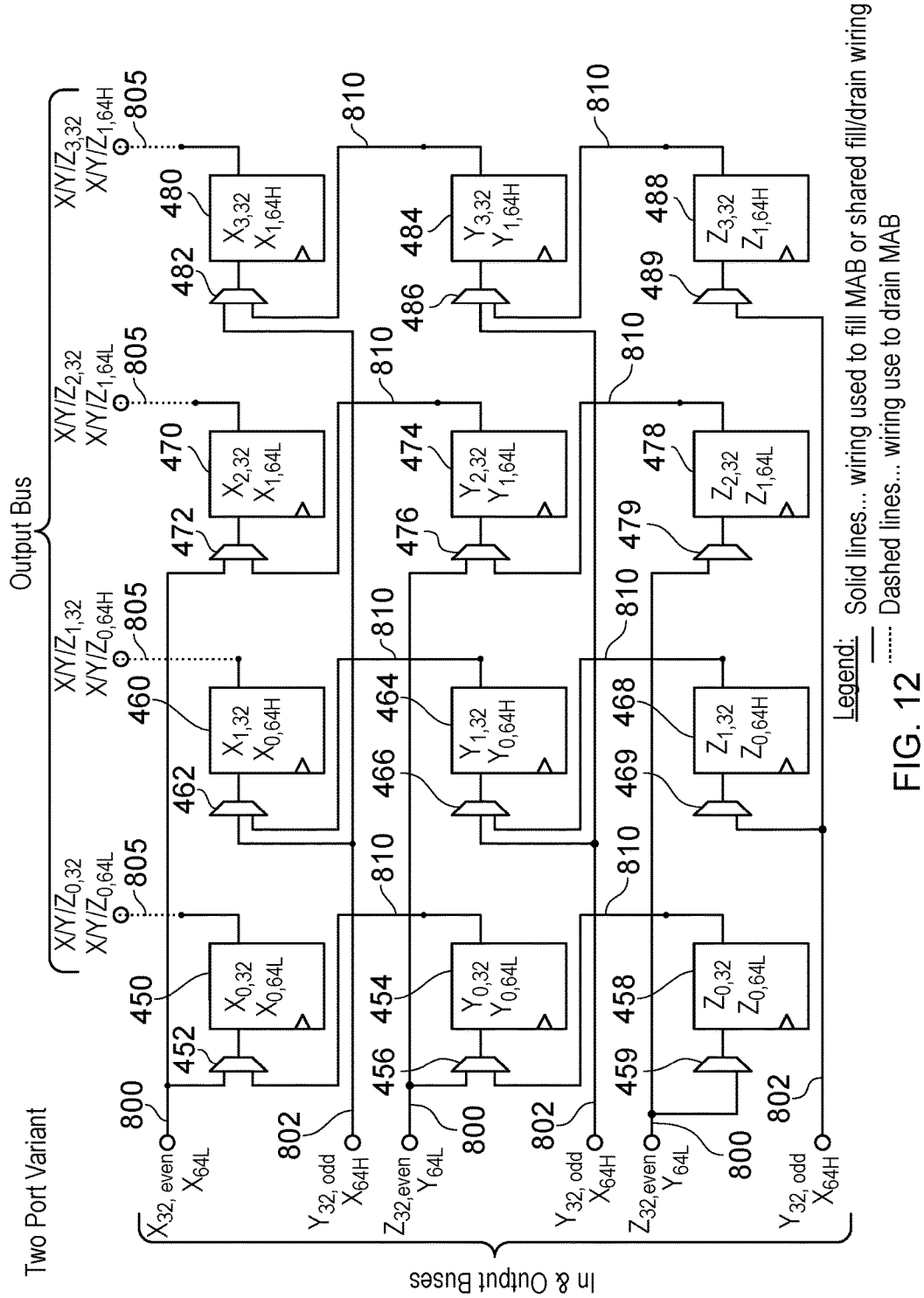
Figure 13:
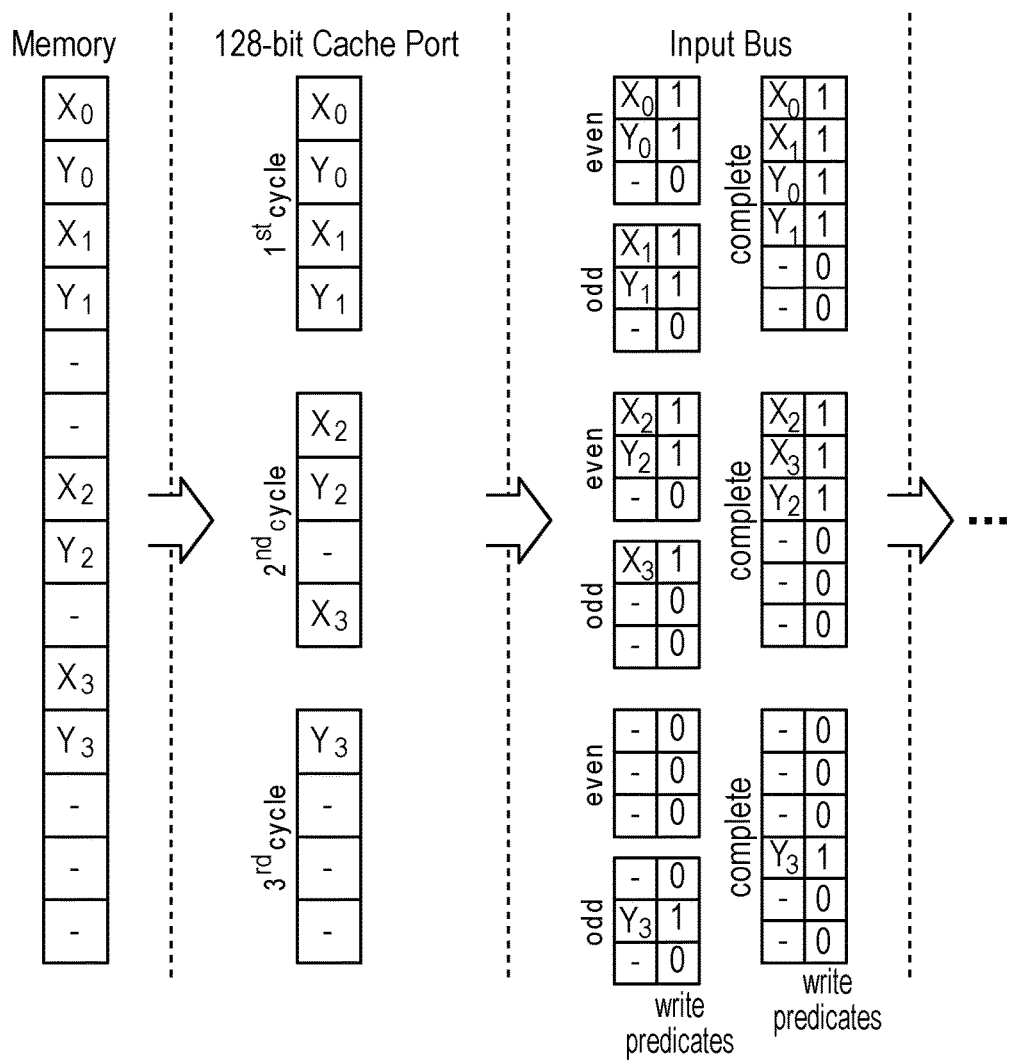
Figure 15:
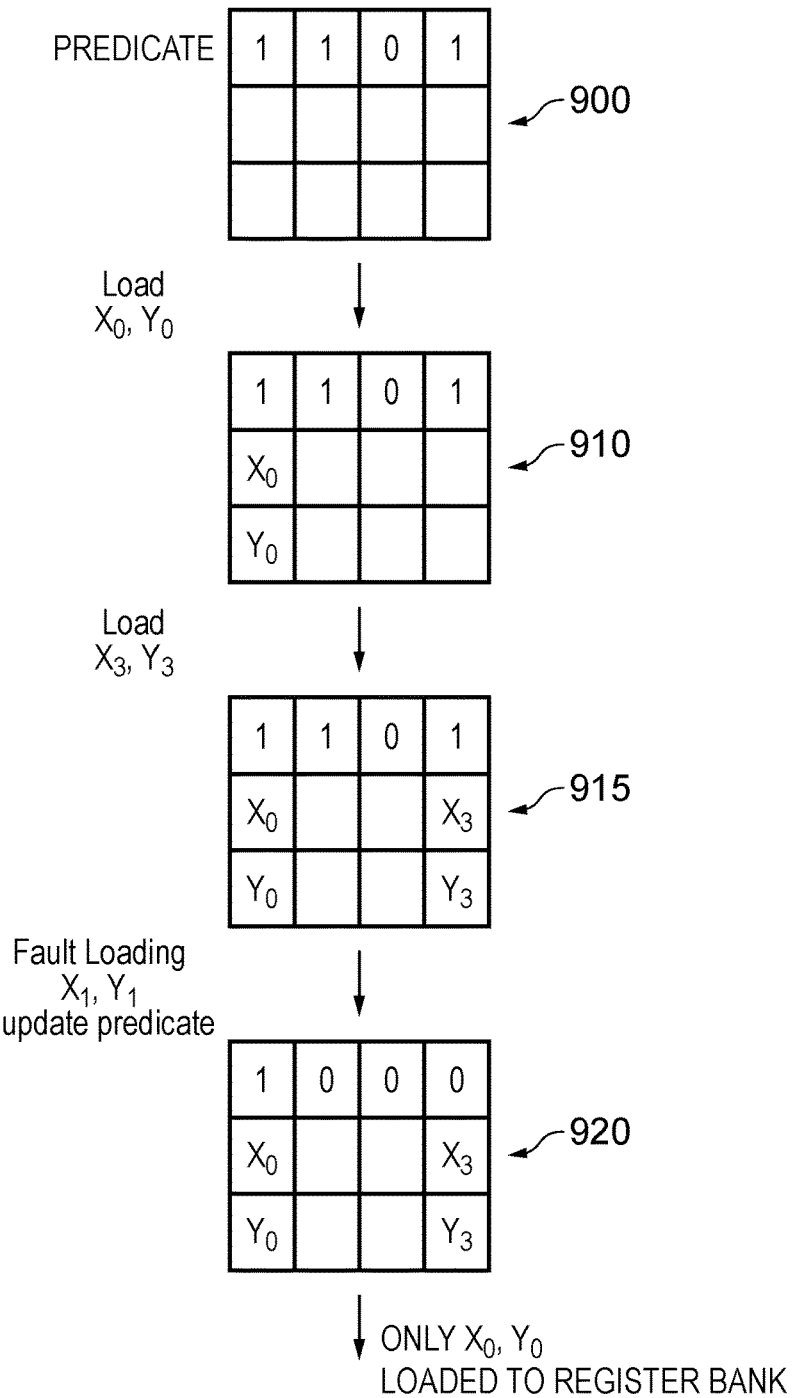

FIG. 6 schematically illustrates a load operation and a store operation employing the multi-axial buffer of one embodiment;

FIG. 7 schematically illustrates a load operation performed using the multi-axial buffer in accordance with one embodiment;

FIG. 8 is a diagram illustrating an array of storage elements provided within the multi-axial buffer in accordance with one embodiment, along with associated routing circuitry;

FIG. 9 illustrates how different sized data elements may be aligned so as to allow processing of those data elements within the multi-axial buffer of one embodiment;

FIG. 10 illustrates an arrangement of storage elements and associated routing circuitry in accordance with one embodiment to support the use of different sized data elements;

FIG. 11 illustrates a further example arrangement of storage elements and routing circuitry that includes additional multiplexing to allow increased flexibility in the way that the individual rows and columns are accessed;

FIG. 12 illustrates a yet further example arrangement of storage elements and routing circuitry that allows multiple data structures to be stored into the array at the same time;

FIG. 13 illustrates an example load sequence that can take advantage of the arrangement of FIG. 12;

FIGS. 14A and 14B illustrate how speculative load operations are processed, for both no fault and speculative fault scenarios, in accordance with one embodiment; and FIG. 15 illustrates how the predicate storage associated with the multi-axial buffer may be updated on detection of a speculative fault during a load operation.

Before discussing the embodiments with reference to the accompanying figures, the following description of embodiments is provided.

In one embodiment, an apparatus is provided that has first interface circuitry to receive data structures retrieved from memory, where each data structure has an associated identifier and comprises N data elements. In addition, multi-axial buffer circuitry is provided that has an array of storage elements, where along a first axis the array is organised as N sets of storage elements, each set containing a plurality VL of storage elements, and where along a second axis the array is organised as a group of N storage elements, each group containing a storage element from each of the N sets. For each data structure received by the first interface circuitry, the access control circuitry then stores the N data elements of that received data structure in one of the groups, selected in dependence on the associated identifier for that data structure. Responsive to an indication that all the required data structures have been stored in the multi-axial buffer circuitry, second interface circuitry then outputs the data elements stored in one or more of the sets of storage elements as one or more corresponding vectors of data elements for storage in a register bank, each vector containing VL data elements.

Such an approach can significantly reduce the number of accesses to memory and/or the register bank, allowing N vectors to be constructed in parallel as each data structure is retrieved, and with the register bank only needing to be accessed once the full vector(s) have been constructed based on the retrieved data structures. In addition, the multi-axial buffer circuitry can readily accommodate data structures retrieved from memory in any order, since each data structure has an associated identifier, and that identifier is used to determine into which group along the second axis a particular retrieved data structure is stored.

Even in situations where N=1, and accordingly each data structure only contains a single data element, and thus only a single vector is being constructed, the above apparatus still provides the benefit of being readily able to accommodate the data structures being retrieved from memory in any order, and only requires the register bank to be accessed once the full vector has been constructed.

However, in one embodiment N is an integer of 2 or more, in which event the apparatus allows multiple vectors to be created in parallel, thus reducing the number of memory accesses that would otherwise be required.

In one embodiment, the required data structures may be stored contiguously within the memory address space. However, in another embodiment, one or more of the required data structures are stored in memory at non-contiguous addresses with respect to others of the required data structures. In such scenarios, this increases the likelihood that it will be more efficient for the memory to return the requested data structures in an order different to the order in which they were requested, for example due to various of the requested data structures already being cached while others are not, and as mentioned above the apparatus of the above described embodiment can readily accommodate such out of order data, due to the mapping of the identifiers associated with each data structure to particular groups of storage elements within the multi-axial buffer circuitry.

In the above described embodiment, the apparatus is used to perform a load operation to transfer a plurality of data structures from memory into one or more vectors of data elements stored in the register bank. However, in one embodiment the apparatus can additionally be used to perform a store operation in order to store N vectors of data elements from the register bank to memory as a plurality of data structures that each comprise N data elements. In particular, in one such embodiment, the access control circuitry is further arranged to re-use the multi-axial buffer circuitry during performance of such a store operation, by causing the multi-axial buffer to be accessed to store each vector of data elements received via the second interface from the register bank in an associated set of storage elements along the first axis. The access control circuitry then causes one or more data structures to be retrieved from one or more associated groups of storage elements along the second axis for output via the first interface circuitry to the memory. Hence, the above described apparatus provides a very efficient mechanism for performing both load operations and store operations.

In one embodiment, all of the individual data elements within a particular vector will be required, and accordingly for the earlier described load operation the indication that the required data structures have been stored in the multi-axial buffer circuitry will occur once each of the groups have been populated with a retrieved data structure. However, in an alternative embodiment, the apparatus includes additional functionality to mark certain data structures as not being required, thereby further reducing the number of memory accesses required, and enabling the vectors to be output more quickly. In particular, in one embodiment the apparatus further comprises predicate storage to store, in association with each group of storage elements along the second axis, a predicate value indicating whether the associated group of storage elements is active or inactive, and the required data structures are those associated with an active group of storage elements. Hence, once data structures have been stored within all of the active groups, the second interface circuitry can then output the data elements stored in each set of storage elements as a corresponding vector of data elements for storage in the register bank.

In one embodiment, the first interface circuitry is arranged to suppress retrieval from the memory of data structures associated with an inactive group of storage elements. Accordingly, the predicate information can be referred to in order to determine the number of accesses to memory required, and performance is improved by avoiding the need to perform accesses to any data structures that will not be included within the resultant vector.

Such predicate information can also be used when performing the earlier described store operation. In particular, during such a store operation the first interface circuitry is arranged to suppress output to the memory of any data structure associated with an inactive group of storage elements, hence again reducing the number of memory accesses required.

In one embodiment, the second interface circuitry comprises insertion circuitry to insert, when outputting the vector of data elements for storage in the register bank, a predetermined data value in each data element position within the vector of data elements that is associated with an inactive group of storage elements. Accordingly, once all of the required data structures have been retrieved from memory and stored in the relevant groups of the multi-axial buffer circuitry, then as each vector is read out for storage in the register bank, the second interface circuitry can add a predetermined data value at each inactive data element position. This provides a mechanism to ensure that the output vector retains the required vector length, and accordingly each of the relevant data elements occupies the required lane within the resultant vector. It further ensures that a predictable, "don't care", value is stored within any inactive lane positions within the vector. The predetermined value can take a variety of forms, but in one embodiment is a logic "0" value.

It is possible that a particular memory access may not retrieve all the data elements of a particular data structure, and accordingly the first data element retrieved by a particular memory access may not be the initial data element within the data structure. To accommodate this, and ensure that the retrieved data elements are stored within the correct storage elements of the multi-axial buffer circuitry, in one embodiment the first interface circuitry comprises alignment circuitry to align the data elements of a data structure retrieved from the memory with an internal bus format. By way of example, if a group of storage elements along the second axis comprises three storage elements, for storing X, Y and Z coordinates, respectively, of a data structure, and if a current access retrieves the Y and Z coordinate values of the data structure, the alignment circuitry will ensure that those Y and Z coordinate values are stored within the second and third storage elements of the group, typically with the first storage element not being updated.

In one particular embodiment, the apparatus further comprises a write predicate field associated with the internal bus format to identify which data elements on the internal bus are required to be stored in the multi-axial buffer circuitry. Hence, this enables particular data elements to be marked as the data elements that should be stored in the multi-axial buffer circuitry. Thus, considering the specific example mentioned above, if the internal bus is three data elements wide, the write predicate information could mark the first data element as invalid and the second and third data elements as valid, hence causing the Y and Z coordinate values to be stored within the correct storage elements of the relevant group of the multi-axial buffer circuitry.

In one embodiment, the apparatus further comprises allocation circuitry to allocate the associated identifiers of the data structures to corresponding groups of storage elements within the array, for use by the access control circuitry when determining into which group to store the N data elements of a received data structure. Hence, the way in which the particular data structures are mapped to the individual groups can be controlled by the allocation circuitry.

In one embodiment, the allocation circuitry may be further arranged to determine the predicate values to store in the predicate storage. Hence, based on information about the desired load or store operation to be performed, the allocation circuitry can determine which groups of storage elements need to be used, and can set the predicate values accordingly.

In one embodiment, the multi-axial buffer circuitry may be configured to only be used for a single load operation or a single store operation at a time. However, in an alternative embodiment, the multi-axial buffer circuitry may have a large enough number of storage elements to enable multiple independent arrays of storage elements to be defined therein, with each array being associated with a particular load or store operation, hence allowing multiple such load or store operations to be in flight at the same time, whilst making use of the above described apparatus.

In one such embodiment, the allocation circuitry is further arranged to specify the array of storage elements within the multi-axial buffer circuitry to be used for each such load or store operation, and the access control circuitry is arranged to control use of the multi-axial buffer circuitry to enable multiple access operations to be processed in parallel using different arrays of storage elements within the multi-axial buffer circuitry. Hence, the allocation circuitry can configure the size of each array having regards to the number of data elements within the data structure, and the number of data structures to be accessed, i.e. the vector length, for any particular load or store operation, and within the size constraints of the multi-axial buffer can potentially arrange for multiple such arrays to be defined independently within the buffer in order to enable multiple load and store operations to be processed at least partly in parallel. There may be a significant number of accesses required to process each such load or store operation, and the ability to at least partially parallelize such operations can yield significant performance benefits.

In one embodiment, the allocation circuitry is arranged to release the array of storage elements for use in connection with another access operation once the data elements stored in each set of storage elements have been output as a corresponding vector of data elements for storage in the register bank. In particular, once the second interface circuitry has output the required vectors to the register bank, a control signal can be issued to the allocation circuitry to cause the load operation to be committed, at which point the array of storage elements can be released. A similar control signal can be issued for a store operation, once the final data structure has been output for storage to memory from the multi-axial buffer array.

The allocation circuitry can be arranged in a variety of ways, but in one embodiment is provided within decode circuitry used to produce a series of micro-operations to implement the load operation to transfer a plurality of data structures from memory into one or more vectors of data elements stored in the register bank. In particular, since the decode circuitry is used to analyse the relevant instructions to determine the accesses required to perform a load operation, or indeed a store operation, as described above, it will have access to the information about the format and number of data structures to be accessed, and accordingly is well placed to determine how to configure the array of storage elements within the multi-axial buffer circuitry.

In one embodiment, the decode circuitry will allocate micro-operation identifiers to each of the micro-operations produced to implement the load or store operation, and the associated identifiers for each data structure can be derived from the micro-operation identifiers generated by the decode circuitry. Hence, the data structure identifiers can be readily determined by at least partially reusing identifier information generated by the decode circuitry in order to control the required micro-operations. There may for example be a one-to-one correspondence between the micro-operation identifiers and the identifiers of the data structures, for example where each micro-operation retrieves exactly one data structure from memory. However, it will be appreciated that there is no need for such a one-to-one correspondence, since for example one micro-operation may be able to retrieve multiple data structures, or indeed multiple micro-operations may be required to retrieve a particular data structure.

In one embodiment, the data structure format and the desired vector length VL drive the determination of the micro-operations and the identifiers associated with them.

The multi-axial buffer circuitry may be arranged in a variety of ways. However, in one embodiment the apparatus further comprises routing circuitry within the multi-axial buffer circuitry to enable the groups of storage elements to be updated in any order.

In one embodiment, the routing circuitry further provides a drain path to enable each set of storage elements to be accessed serially when outputting each vector of data elements for storage in the register bank. Such an approach can reduce the complexity of the routing required within the multi-axial buffer circuitry.

Furthermore, in one embodiment where the multi-axial buffer circuitry is also used in association with store operations, the drain path may be reused during the store operation to serially store each vector of data elements received via the second interface from the register bank in an associated set of storage elements along the first axis. This further simplifies the construction of the required routing circuitry within the multi-axial buffer circuitry.

In an alternative embodiment, the routing circuitry includes multiplexing circuitry to enable each set of storage elements to be accessed in any order. This hence provides additional flexibility as to how the sets of storage elements are accessed.

In one embodiment, the multi-axial buffer circuitry may be used in association with both load/store operations operating on data elements of one size, and load/store operations operating on a different size of data element. In particular, in one embodiment the routing circuitry is arranged such that the access control circuitry uses the same array of storage elements within the multi-axial buffer circuitry, irrespective of whether the data elements being processed are of a first size or at least one further size different to said first size. This hence provides an efficient mechanism for using the multi-axial buffer circuitry in association with multiple data element sizes.

In one embodiment, only a single data structure may be written into the multi-axial buffer circuitry at a time. However, in an alternative embodiment the routing circuitry comprises a plurality of ports to enable multiple of the groups of storage elements to be updated at the same time, thus enabling multiple data structures to be written into, or read from, the multi-axial buffer circuitry at the same time.

If desired, a multi-port approach may also be provided for accessing the sets of storage elements, so as to enable more than one set of storage elements to be accessed at the same time. This can improve processing speed in connection with register banks that allow multiple vector registers to be accessed at the same time, in particular during a load operation this enabling multiple vectors to be stored into the register bank from the multi-axial buffer circuitry at the same time. Similarly, for a store operation where the data is passed back to memory, such an approach will enable multiple vectors read from the register bank to be stored in the multi-axial buffer circuitry at the same time.

When performing a load operation of the type described earlier, where multiple data structures are transferred from memory into one or more vectors of data elements stored in the register bank, it may be the case that at least some of the data structures accessed are accessed speculatively. In particular, when vectorising the code to take advantage of the available vector operations, some of the data structures loaded into the vectors may or may not in due course actually be required for processing. In such situations, the apparatus can note that one or more of the accesses to be performed during the load operation are speculative accesses. If a fault occurs during a normal access, then it will typically be necessary to process that fault, for example by taking an exception. However, in one embodiment, if a fault is detected during a speculative retrieval of one or more of the data structures from memory, such action is not taken. Instead, in one embodiment, the predicate storage is updated to mark the group of storage elements associated with the data structure that gave rise to the fault as being inactive, and in addition to mark all subsequent groups of storage elements within the array as inactive. Then, when all of the required data structures have been loaded into the multi-axial buffer (noting that any data structures associated with groups of storage elements that have been marked as inactive are not required), the second interface circuitry can at that point output the loaded data elements stored in each set of storage elements as corresponding vectors of data elements for storage in the register bank.

When combined with the earlier embodiment that included insertion circuitry for inserting a predetermined value in each data element position associated with an inactive group of storage elements, this will ensure that following a fault occurring during a speculative retrieval of data structures, the relevant data elements for both that speculative retrieval and all subsequent speculative retrievals are set to the predetermined data value within the vectors output to the register file. In this case, no fault needs to be raised, and processing can hence continue. For example, at some subsequent time retrieval of such speculative data elements may be retried. It may be the case that a fault is no longer detected, for example because a different page has been loaded, and accordingly a previously detected page fault no longer applies. It may also be the case that some of the accesses previously considered speculative are no longer speculative. In that case, how any subsequent faults are handled will depend on whether the access in question is still speculative or not.

Particular embodiments will now be described with reference to the Figures.

Figure 1:
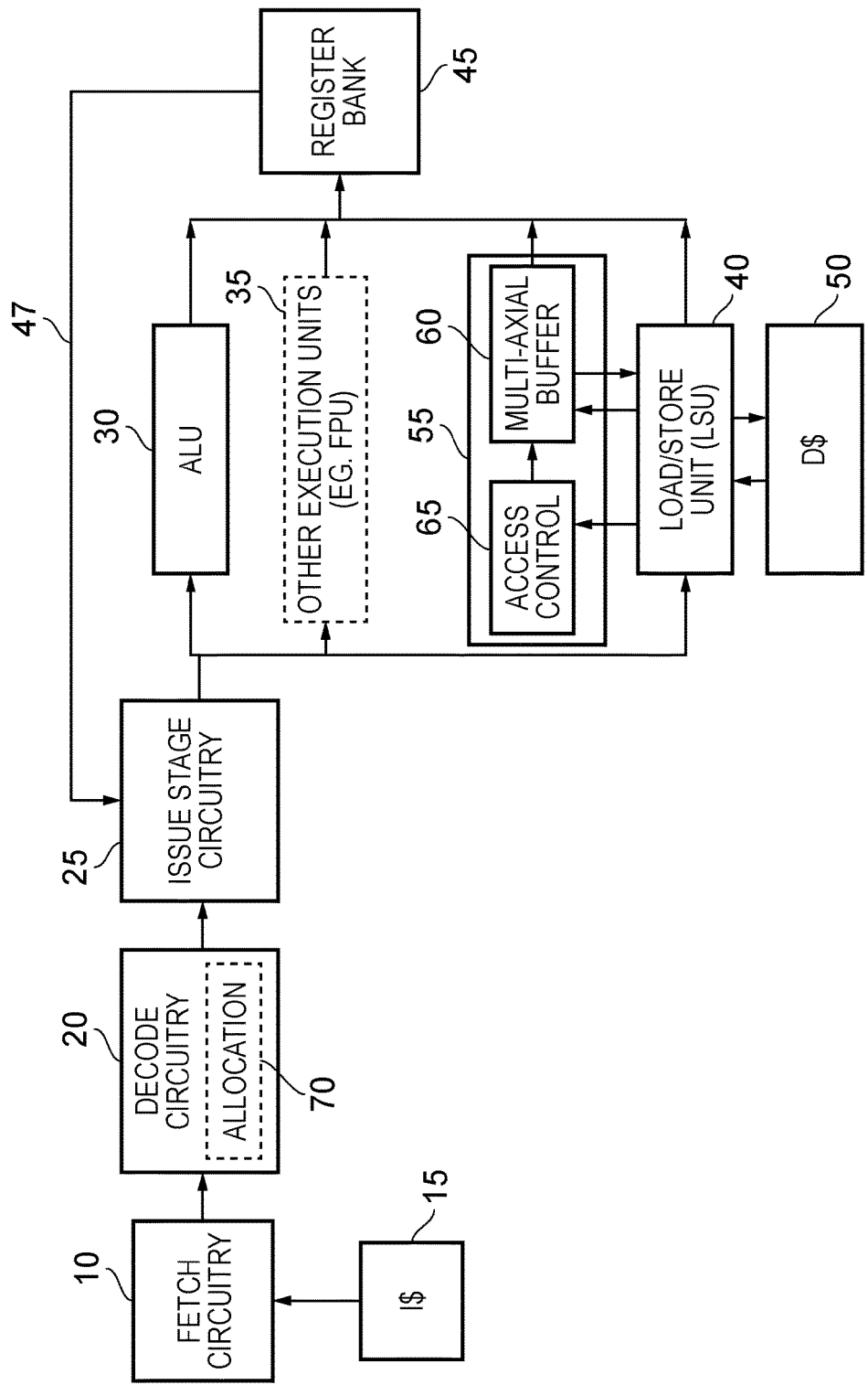
FIG. 1 is a block diagram of a data processing apparatus in accordance with one embodiment.

FIG. 1 is a block diagram of a system in which the techniques of the described embodiments may be employed. In the example shown in FIG. 1, the system takes the form of a pipelined processor. Instructions are fetched from an instruction cache 15 by the fetch circuitry 10, from where they are passed through decode circuitry 20 which decodes each instruction in order to produce appropriate control signals for controlling downstream execution resources within the pipelined processor to perform the operations required by the instructions. The control signals forming the decoded instructions are passed to issue stage circuitry 25 for issuing to one or more execution pipelines 30, 35, 40 within the pipelined processor. As shown by the dotted box 70 in FIG. 1, allocation circuitry within the decode circuitry 20 may be arranged to allocate certain resources within the system for use when performing certain operations.

The issue stage circuitry 25 has access to the register bank 45 in which data values forming source operands for the various operations can be stored. These source operands can be routed via a path 47 into the issue stage circuitry, so that those source operands can be dispatched to the appropriate execution unit along with the control signals identifying the operation(s) to be performed to implement each decoded instruction. Arithmetic operations may for example be forwarded to the arithmetic logic unit (ALU) 30 along with the required source operands, in order to enable an arithmetic logic operation to be performed on those source operands, with the result value typically being output as a destination operand for storing in a specified register of the register bank 45.

In addition to the ALU 30, other execution units 35 may be provided, for example a floating point unit (FPU) for performing floating point operations in response to decoded floating point instructions. In addition, a load/store unit (LSU) 40 is used for performing load operations in order to load data values from memory, including one or more levels of data cache 50, into specified registers of the register bank 45, and for performing store operations in order to store data values from the register bank 45 back to the memory 50.

The system shown in FIG. 1 may be an in-order processing system where a sequence of instructions are executed in program order, or alternatively may be an out-of-order system, allowing the order in which the various instructions are executed to be reordered with the aim of seeking to improve performance. As will be understood by those skilled in the art, in an out of order system, additional structures (not explicitly shown in FIG. 1) will be provided, for example register renaming circuitry to map the architectural registers specified by the instructions to physical registers from a pool of physical registers within the register bank 45 (the pool of physical registers typically being larger than the number of architectural registers), thereby enabling certain hazards to be removed, facilitating more use of out of order processing. In addition, a reorder buffer will typically be provided to keep track of the out of order execution, and to allow the results of the execution of the various instructions to be committed in order.

In the described embodiments, the processing circuitry of FIG. 1 is arranged to execute vector operations on vector operands stored in the register bank 45, where a vector operand comprises a plurality of data elements. When a vector operation is performed on such a vector operand, the required operation is applied repetitively across the various data elements within the vector operand. In one embodiment the register bank 45 is a vector register bank, where each vector register within the vector register bank may store a vector operand comprising a plurality of data elements.

When performing a load operation to store the required data elements as a vector operand within one of the registers of the register bank 45, it may be the case that the individual data elements required are not located consecutively within memory, and accordingly a gather operation is required to access the required data elements from the various memory locations, and to store them at the appropriate locations within the vector register. Similarly, a corresponding scatter operation may be required when performing a store operation in order to store the data elements contained within a vector register back to their required locations within memory. Performance of such gather or scatter operations can require a significant number of accesses to the memory system and/or to the relevant vector register within the register bank.

In the present application, the term "data-structure" will be used to refer to N consecutive data elements associated with one of the memory addresses for a gather or scatter operation. Whilst a data structure may include a single data element (i.e. where N=1), and hence a gather or scatter operation in that case involves the movement of a number of data elements (equal to a specified vector length value VL) between memory and a particular vector register arranged to hold as the vector operand the VL data elements, when each data structure includes more than one data element (i.e. where N is 2 or more) the required gather or scatter operations can be supplemented to allow multiple vector operands to be processed in parallel. For example, if each data structure comprises three data elements, for example representing X, Y and Z coordinate values, then a series of gather operations can be arranged to collate all of the X data elements for storage in a first vector register, all of the Y data elements for storage in a second vector register, and all of the Z data elements for storage in a third vector register. Similarly, a corresponding series of scatter operations can be arranged to store the contents of those three vector registers back out to memory.

A number of instructions may be specified which, when decoded by the decode circuitry 20, cause such gather or scatter operations to be implemented using the LSU 40. The various memory addresses required for the gather or scatter operations can be specified in a number of ways, for example using a scalar base address, and a vector of offsets.

In accordance with the described embodiments, the performance of such gather and scatter operations is increased through the use of circuitry 55, which consists of a multi-axial buffer 60 formed as an array of storage elements and associated routing circuits, controlled by access control circuitry 65. Along a first axis, the array of the multi-axial buffer is organised as N sets of storage elements, where each set contains a plurality VL of storage elements. Along a second axis, the array is organised as groups of N storage elements, where each group contains a storage element from each of the N sets.

When the decode circuitry 20 determines from the input instruction stream that a gather type of load operation is required for a series of data structures, or a scatter type of store operation is required for such a series of data structures, it will allocate a series of micro-operations in order to implement the required load or store operations, and will allocate micro-operation identifiers to each of the various micro-operations. The number of data elements within each data structure, along with the vector length VL and any predicate information, will influence the number of micro-operations required, as will the size of the data bus between the data cache 50 and the load/store unit 40 and the relative alignment of the various memory addresses of the data structures with cache line boundaries, etc. During this process, the allocation circuitry 70 can associate individual identifiers with each data structure, and can also be arranged to configure the multi-axial buffer 60 to provide an array of storage elements with the required number of sets along the first axis (dependent on the number of data elements in each data structure) and the required number of groups along the second axis (dependent on the vector length VL). In one embodiment, the allocation circuitry is also arranged to allocate one of the data structure identifiers to each group of storage elements.

Accordingly, when considering performance of a series of micro-operations to perform a load operation to gather a number of data structures from memory in order to produce N vector operands of data elements, as each data structure is accessed from the data cache 50, the access control circuitry 65 can be arranged to store the data elements of that received data structure into one of the groups within the array of the multi-axial buffer 60 in dependence on the associated identifier for that data structure. This can be done irrespective of the order in which the micro-operations are performed, and hence irrespective of the order in which the data structures are accessed, due to each of the groups along the second axis within the array being associated with one of the data structure identifiers, and accordingly the access control circuitry 65 being able to determine, based on the identifier of a received data structure, where to store the received data elements within the multi-axial buffer. Once all of the required data structures have been retrieved from memory, the array will then contain the required vector operand(s) and in particular each set of storage elements will contain one of the required vector operands. Each vector operand can then be written out from the multi-axial buffer 60 into the relevant register(s) of the register bank, typically such registers having been identified by the instruction(s) that caused the load operation to be performed.

Similarly, for a scatter style store operation, each vector operand to be subjected to that store operation can be stored in one of the sets of the multi-axial buffer 60. Thereafter, a series of store micro-operations can be performed in order to store each required data structure to its associated address in the data cache/memory 50, by accessing each of the groups of storage elements along the second axis in order to retrieve the individual data structures.

By such an approach, this can significantly reduce the number of memory accesses required in order to perform such load or store operations. In addition, it can also reduce the number of accesses required to the registers of the register bank, since each individual vector operand can be written into the register bank in one go during a load operation, or can be retrieved from the register bank in one go during a store operation.

Figure 2:
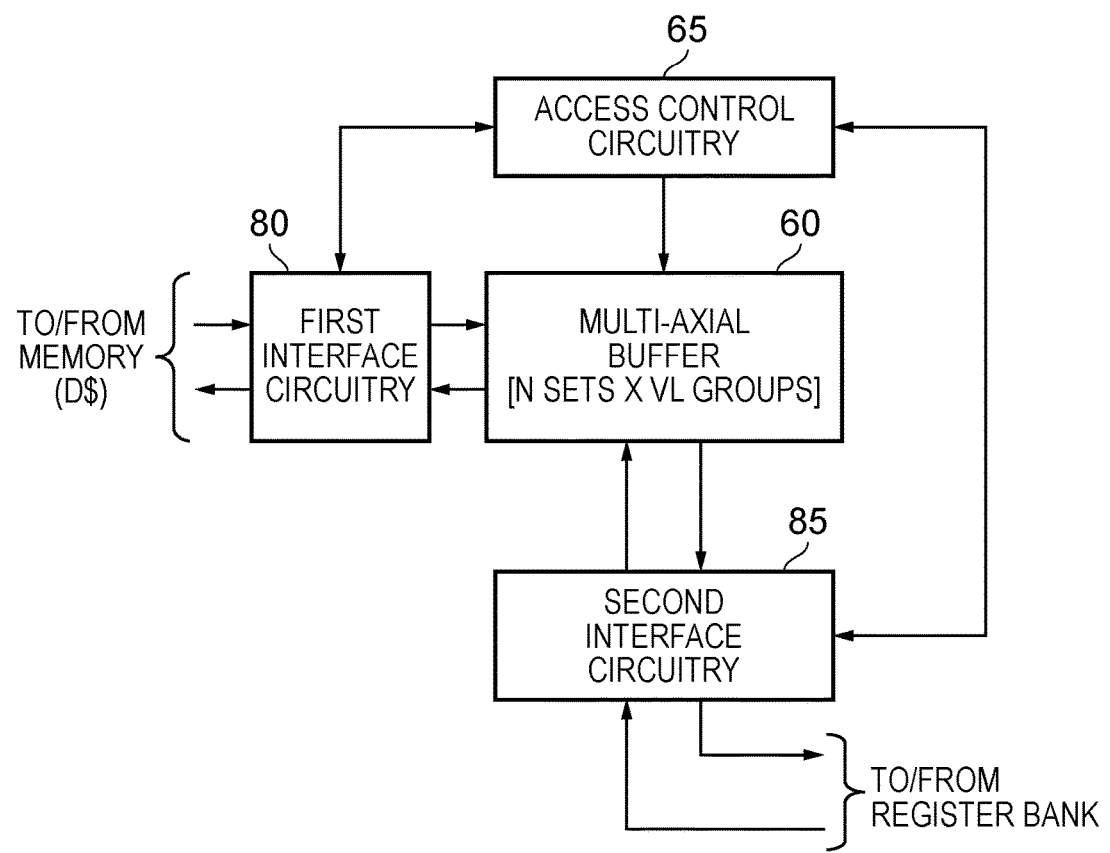
FIG. 2 is a block diagram of an apparatus in accordance with one embodiment, employed when transferring a plurality of data structures between memory and one or more vectors of data elements stored in the register bank of FIG. 1.

FIG. 2 is a block diagram illustrating the circuitry 55 in more detail. The multi-axial buffer 60 consists of an array of storage elements forming N sets along a first axis (the horizontal axis in FIG. 2) and VL groups of storage elements along the second axis (the vertical axis in FIG. 2). First interface circuitry 80 (which in one embodiment may be part of the LSU 40) is arranged to receive individual data structures from memory during load operations, or to output individual data structures to memory during store operations, and under the control of the access control circuitry 65 can access individual groups of storage elements within the multi-axial buffer. Hence, during a load operation, this enables each retrieved data structure to be stored into a specified one of the groups within the multi-axial buffer 60 under the control of the access control circuitry 65, having regard to the identifier associated with that data structure.

The second interface circuitry 85 (which again may in one embodiment be part of the LSU 40) is arranged to interface between the multi-axial buffer 60 and the register bank 45, and allows an individual vector of data elements to be accessed in one of the sets of storage elements within the multi-axial buffer. For example, during a load operation, once all of the required data structures have been stored within the multi-axial buffer, a set within the multi-axial buffer may be accessed via the second interface circuitry 85 in order to cause a required vector of data elements to be output to a specified register within the register bank. This process can be repeated in turn for each of the sets within the multi-axial buffer. During a store operation, the contents in each specified vector register within the register bank may be input into a corresponding set in the multi-axial buffer via the second interface circuitry 85, whereafter a series of accesses by the first interface circuitry 80 may cause the individual data structures to be output for storage in memory.

Figure 3:
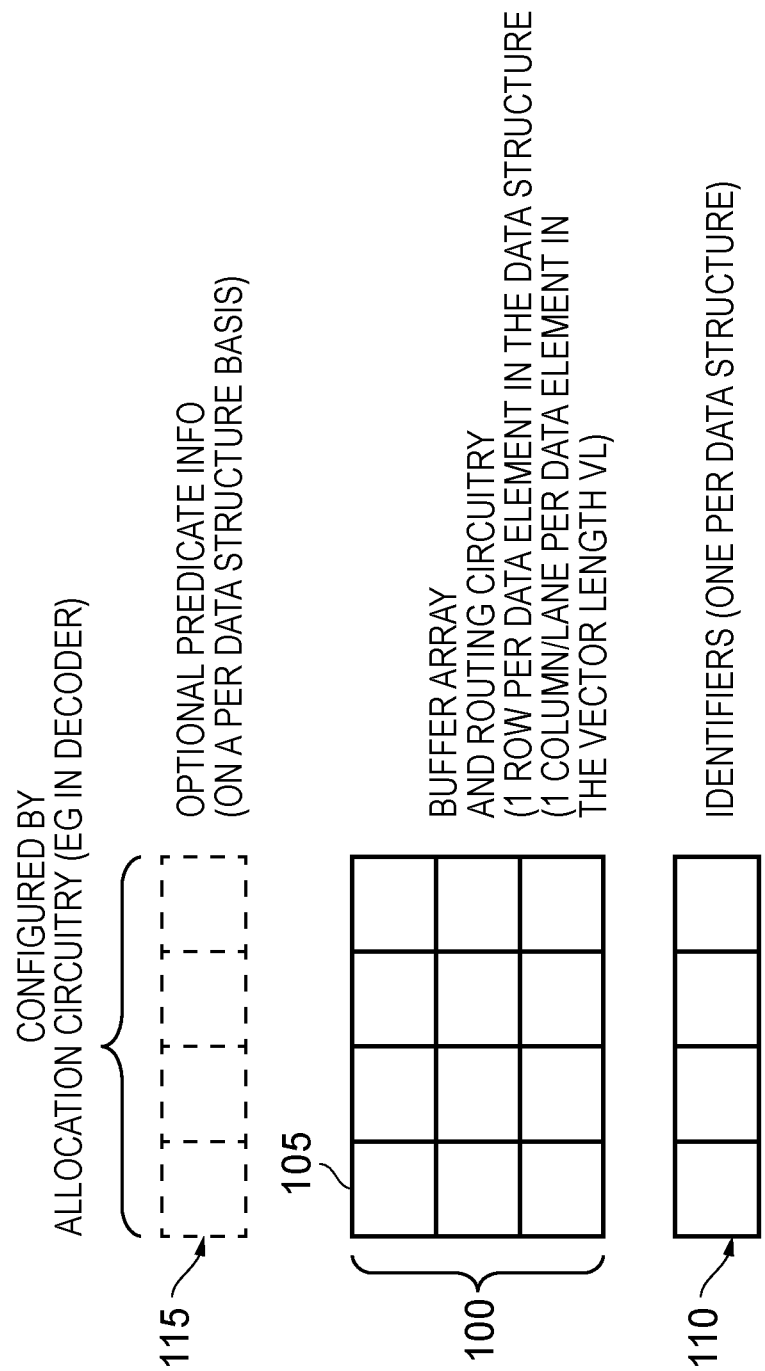
FIG. 3 illustrates in more detail the multi-axial buffer of FIG. 2 in accordance with one embodiment.

FIG. 3 schematically illustrates the contents of the multi-axial buffer 60 of FIG. 2 in one embodiment. The multi-axial buffer includes a buffer array 100, comprising an array of individual storage elements 105. In this arrangement, one row of storage elements is provided for each data element in a data structure. Accordingly, considering the earlier example of a data structure having three data elements comprising X, Y and Z coordinates, there will be three rows within the buffer array 100. In addition, there is one column/lane within the buffer array for each data element in the vector length VL. Accordingly, in the example of FIG. 3 it is assumed that the vector length is 4, and accordingly there are four columns of data elements. The various data elements within a particular column form the earlier described group of storage elements into which an individual data structure can be stored under the control of the first interface circuitry 80. Also provided in association with the array 100 is an identifier storage 110 providing an indication of the identifier associated with each group of storage elements. As mentioned earlier, the identifier for each group will correspond with the identifier of one of the data structures being accessed.

In addition, in one embodiment there is optionally also provided a predicate storage 115 allowing a predicate value to be specified for each group of storage elements, and hence on a per data structure basis. This can be used to allow certain data structures to be skipped during the processing of the load or store operation, thereby increasing the flexibility in how the multi-axial buffer is used. In one embodiment, the predicate values identify whether the corresponding group of storage elements is active or inactive. For any inactive group, the corresponding data structure is not accessed during the load or store operation, hence reducing the number of accesses performed with respect to the memory. For a load operation, this has the result that once the data structures associated with all of the active groups have been stored within the multi-axial buffer, this is the point at which all of the required data structures are available, and at that point the vector in each row can be output to the register bank. In one embodiment, predetermined logic values can be inserted at the data element positions associated with any inactive group as the data is output to the register bank. For example, in one embodiment a logic "0" value can be inserted at each of the relevant data element positions. During a store operation, the multi-axial buffer can be populated with the contents of the relevant registers of the register bank, and then the values stored in any inactive group can merely be overlooked during the output of data from the multi-axial buffer to memory, and in particular a store micro-operation is not required to output the contents of any inactive group to the memory.

Figure 4:
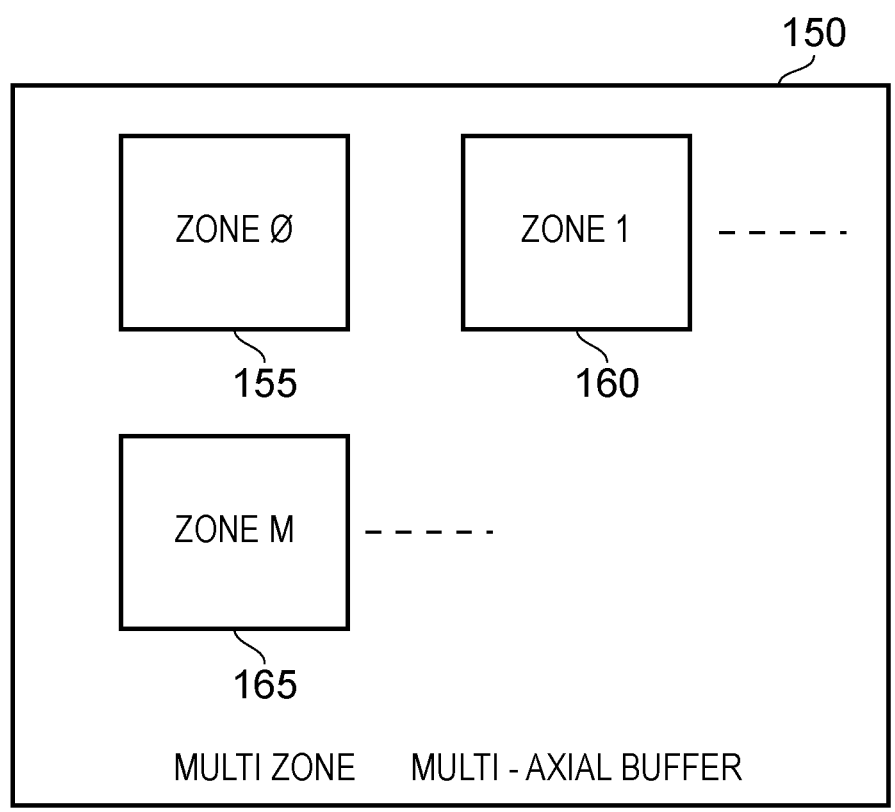
FIG. 4 illustrates how the multi-axial buffer may be arranged into multiple zones in accordance with one embodiment.

In one embodiment, the multi-axial buffer 60 may be used for a single load or store operation at a time, and once a current load or store operation has been completed, it may then be reallocated to a subsequent load or store operation. However, in an alternative embodiment, the multi-axial buffer 60 may include a number of storage elements that is large enough to enable multiple individual arrays to be defined at the same time, hence forming multiple zones as shown schematically in FIG. 4. This then enables multiple load or store operations to be in flight at the same time, where each such operation makes use of the multi-axial buffer. Hence, in FIG. 4, the multi-axial buffer 150 may consist of multiple zones, each zone being defined as each load or store operation is encountered, based on the number of data elements in the data structures, and the vector length VL. For example, in one embodiment the individual zones 155, 160, 165 may be defined by allocation circuitry 70 within the decode circuitry 20 at the time each load or store operation is identified, and the relevant micro-operations created.

Figure 5:
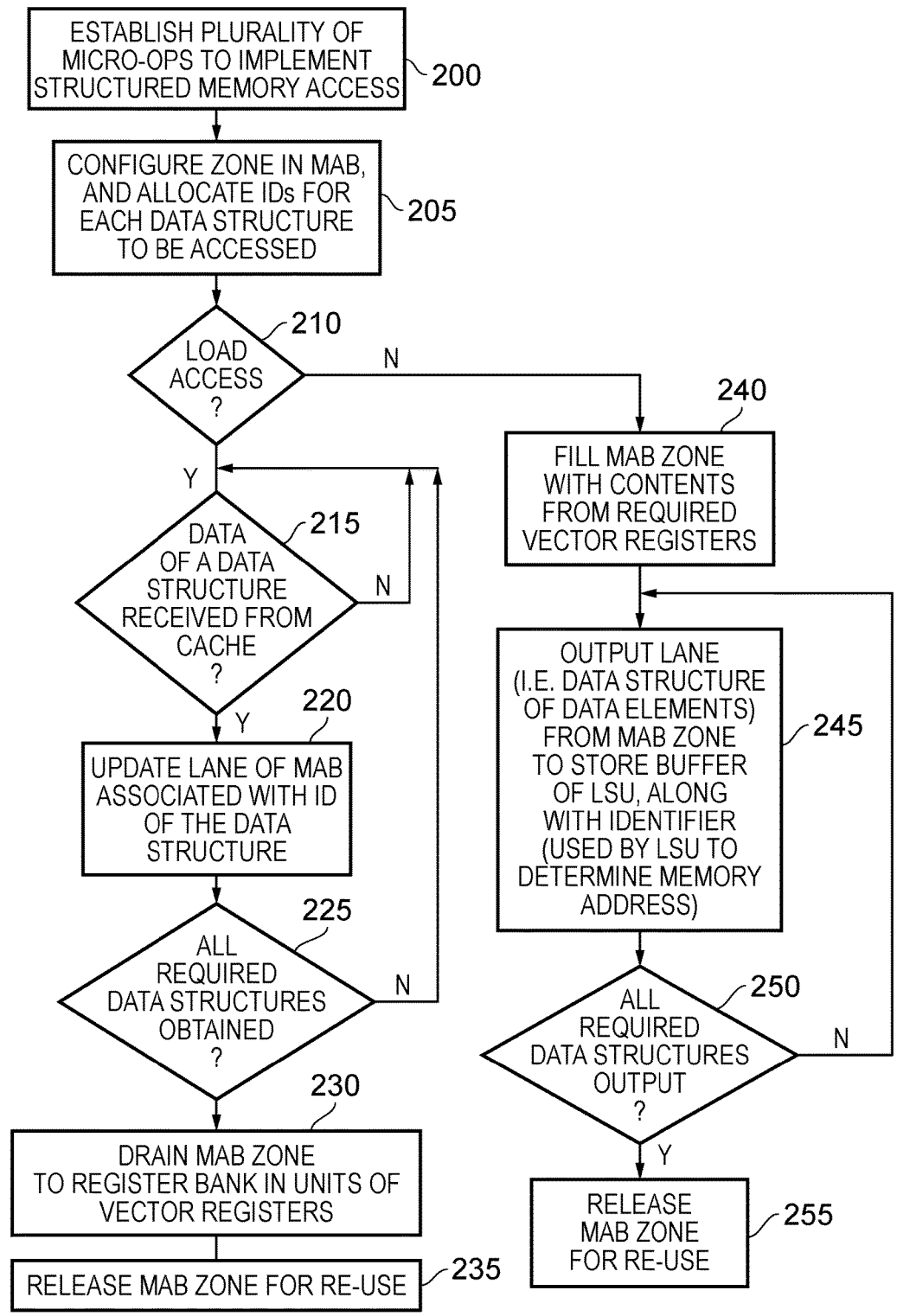
FIG. 5 is a flow diagram illustrating a sequence of steps performed in one embodiment in order to utilize the multi-axial buffer to transfer a plurality of data structures between memory and one or more vectors of data elements stored in the register bank.

FIG. 5 is a flow diagram illustrating steps performed in order to utilize the multi-axial buffer circuitry when processing load or store operations within the data processing system of FIG. 1. At step 200, a plurality of micro-ops are established to implement a structured memory access where multiple data structures are to be accessed. As mentioned earlier, in one embodiment a data structure may only contain a single data element, but in other embodiments each data structure consists of multiple data elements, for example representing coordinate values, RGB values, etc. Further, in one embodiment the individual data structures may be arranged contiguously in memory, but in an alternative embodiment the data structures may be arranged discontiguously in memory, with sufficient information being provided to enable the start address of each data structure to be determined, for example by specifying a scalar base value and a vector of offsets.

At step 205, a required zone is configured within the multi-axial buffer (also referred to herein as a MAB), and IDs are allocated for each data structure to be accessed, in addition each such ID also being associated with one of the groups within the MAB zone. In one embodiment, step 205 is performed by the allocation circuitry 70 associated with the decode circuitry 20 of FIG. 1.

At step 210, it is determined whether the current access is a load access, and if so the LSU 40 will initiate the required micro-ops in order to seek to retrieve the required data structures from memory. Receipt of a data structure is then awaited at step 215. Due to the way in which the memory is organised, and in particular the use of one or more levels of cache, it may often be the case that the data structures are returned to the LSU out of order with respect to the order in which they are requested, for example due to certain data structures already residing in the cache (and hence resulting in a cache hit), whilst other data structures are not yet in the cache (thus resulting in a cache miss and the fetching of the required data from a lower level of the cache hierarchy and/or main memory).

However, as discussed earlier, because of the way in which the multi-axial buffer is arranged, and in particular due to the fact that each data structure identifier is associated with one of the groups of storage elements, out of order receipt of the data structures can readily be accommodated. In particular, once data of a data structure is received from the cache at step 215, then that data is routed via the first interface circuitry 80 into a particular one of the groups of storage elements under the control of the access control circuitry 65, in particular the data structure being routed to the group whose identifier matches the identifier of the data structure. This causes one of the lanes within the MAB to be updated at step 220 with the required data structure values.

In one embodiment, the bandwidth of the bus between the LSU and data cache 50 is wide enough to allow an entire data structure of data elements to be retrieved at one time, and accordingly in that instance all of the storage elements within a particular group in the multi-axial buffer 60 can be updated in one go. However, in an alternative embodiment it may be the case that the bandwidth is insufficient to enable an entire data structure of data elements to be retrieved in one go, or it may be the case that the alignment of the data structure with regards to a cache line boundary is such that multiple accesses are required to retrieve all of the data elements of a data structure. In that instance, in one embodiment the LSU can be arranged to locally buffer the data elements of a particular data structure until all data elements are available, and then to store the data elements of the data structure in one go to the required group within the multi-axial buffer 60. Alternatively, multiple accesses to the multi-axial buffer 60 may be performed, with additional control information (in one embodiment as discussed later, this additional control information being referred to as write predicate information) being used to control which individual storage elements within the group are updated for any particular access.

At step 225, it is determined whether all of the required data structures have been obtained from memory. As discussed earlier, in the absence of the optional predicate information discussed with reference to FIG. 3, or where the predicate information identifies that all of the groups are active, it will be determined that all of the required data structures have been obtained when all of the storage elements in all of the groups have been written to with data retrieved from memory. However, when using the optional predicate information, if any of the groups of storage elements are marked as inactive, it will not be required to obtain from memory the data elements of the data structures associated with those groups, and all required data structures will be considered to have been obtained when data has been written into the storage elements of each active group.

If not all required data structures have been obtained, then the process returns from step 225 to step 215, to await receipt of the next data structure from memory. However, once all required data structures have been obtained, then at step 230 the contents of the MAB zone can be drained to the register cache by the second interface circuitry 85, in units of vector registers. In one embodiment, it is envisaged that each vector operand stored within the MAB 60 can be accommodated within a single vector register, and hence only a single vector register needs to be accessed for each vector operand stored in the MAB. However, if in an alternative embodiment the vector is stored across multiple vector registers, this can easily be accommodated by performing multiple accesses to the register bank in order to store each vector operand to the relevant registers. Further, depending on the number of write ports available with regards to the register bank, it may be possible to store the contents of multiple sets within the multi-axial buffer to the required registers of the register bank at the same time. Alternatively, each set may be accessed sequentially in order to write out one vector to the register bank each cycle.

Once the contents of the MAB zone have been drained to the register bank, then the MAB zone may be released at step 235 by the allocation circuitry 70, for use in association with a subsequent load or store operation.

If at step 210 it is determined that the current access is a store operation, then the process proceeds to step 240, where the MAB zone is filled with the contents from specified vector registers of the register bank 45. This may involve writing the contents of a single vector register into the MAB 60 in each clock cycle, or in alternative embodiments the contents of multiple vector registers may be stored into the MAB 60 in parallel.

Once the required register contents have been stored within the MAB, then individual lanes (i.e. individual groups of storage elements in the second axis) may be accessed in order to retrieve the data elements of the associated data structure, from where they can then be output via the first interface circuitry 80 to a store buffer within the LSU. In accordance with standard practice, store buffer contents can then be output to the data cache 50 under the control of the LSU 40. In one embodiment, the identifier information is also passed to the LSU along with each data structure, to enable the LSU to associate each data structure with a store micro-op to be used to output that data to memory, and also to enable the required memory address for that data structure to be determined.

At step 250, it is determined whether all required data structures have been output. In the absence of the optional predicate information, or where the optional predicate information indicates that all groups are active, this point will be reached once the contents of all of the storage elements within the MAB zone have been output to the LSU. In situations where the optional predicate information identifies certain groups as inactive, then no steps are required in connection with those inactive lanes, and all required data structures will be considered to be output when the contents of all active groups have been output to the LSU. Step 245 is repeated until all required data structures have been output, whereafter at step 255 the MAB zone is released for reuse in connection with a subsequent load or store operation, in one embodiment the release function being performed by the allocation circuitry 70.

FIG. 6 schematically illustrates the use of the MAB during a load and a store operation, a load operation being shown in the upper half of the figure and a store operation being shown in the lower half of the figure. In this example, it is assumed that each data structure includes two elements, namely X and Y coordinate values, and that the vector length is 4. It is also assumed that each data structure is stored at a discontiguous memory location within the memory, as shown by the reference numeral 300. Whilst in one embodiment each of the data structures may be separated from a preceding data structure by a common stride value, in an alternative embodiment the data structures' memory addresses may be entirely unrelated, and appropriate information is required in order to enable the starting address of each data structure, in this example the address of each X value, to be determined. The location of each Y value can then be inferred from the address identified for each X value.

In this embodiment, it is assumed that the data structure addresses and the underlying element size/data type may not align with cache line boundaries, and accordingly it is possible that multiple accesses may be required in order to obtain the data elements of a particular data structure. Whereas in one embodiment in such instances the data could be retained locally within the LSU until all of the data elements of the data structure are provided, in an alternative embodiment alignment circuitry 305 is provided within the first interface circuitry 80 to allow write predicate information 315 to be associated with each data element of a retrieved data structure. This hence enables a determination to be made as to which data elements within a particular group to update with the aligned data 310 retrieved from memory.

In this example, it is assumed that the MAB 60 has been preconfigured to provide 3 sets and 4 groups, hence allowing up to three vectors of vector length four to be created at the same time within the MAB based on the data accessed from memory. However, in this particular example it is assumed that the Z coordinate value is not of interest, and accordingly the write predicate information will always identify that the third data element is not required, irrespective of whether that information is retrieved.

In the example shown in FIG. 6, it is also assumed that the data structure predicate information is of the form "1101" indicating that the third lane is inactive. As a result, the $X_2$ and $Y_2$ values do not need to be retrieved from memory, and instead the MAB is populated with the data 325 after performance of the required sequence of load micro-ops. As also shown in FIG. 6, each group has an associated ID 330, which in combination with an ID 340 associated with the overall load operation, provides a unique ID for each of the groups. As each data structure is retrieved from memory, that ID information is used to determine into which group the data is stored within the MAB. Optionally, the multi-axial buffer may also include storage 335 to store destination register information. Alternatively, this destination register information may be stored elsewhere, for example within a reorder buffer for the earlier mentioned out of order processor example.

Once all of the required data structures are stored within the MAB, then the second interface circuitry 85 is used to drain the contents to the two destinations registers 360, 365 within the register file. In this embodiment, a zeroing circuit 350 consisting of the multiplexer circuitry 355 is used to enable predetermined values to be inserted at each of the inactive data element positions within the vectors. In this particular example, the predetermined value is a logic "0" value, with the multiplexer 355 being controlled using the predicate information in order to determine whether to output for a current row the data element in a particular lane, or instead to populate that data element position with a logic "0" value. Accordingly, following the drain operation, the contents stored in each of the two destination registers 360, 365 is as shown in the upper-right hand side of FIG. 6.

FIG. 6 also shows a corresponding store operation, where the two source vector registers 370, 375 are specified. Each of these registers contains four data elements, and again it is assumed that the first register 370 contains a series of X coordinate values, and the second register 375 contains a series of Y coordinate values. The content of these registers is loaded via the second interface circuitry 85 into the MAB, to form the array of data 380, and again it is assumed that the predicate information 385 is of the form "1101", meaning that the contents of the third lane are inactive. In one embodiment, the $X_2$ and $Y_2$ values may be written into that inactive lane from the register bank, as this may be simpler than overriding that data with a predetermined value such as a logic "0" value. However, in any event, the presence of the logic "0" value within the predicate information for the associated lane will ensure that no store micro-ops are performed in order to store the contents from that lane back out to memory. As with the load operation, the identifier fields 390 specify an identifier for each of the groups, which in combination with the ID information 395 associated with the overall store operation, provide a unique identifier for each group.

Individual groups can then be accessed via the first interface circuitry 80, in order to provide data to the LSU for storing back to the memory address space 300. The ID information associated with each group is used by the LSU to identify the store micro-op(s) allocated to store the data back to memory, and hence the relevant memory address to which the data is to be written.

FIG. 7 is a further diagram illustrating the use of the multi-axial buffer. As shown in this example, the decoder 20 is used to allocate the relevant zone 405, and to provide associated control information such as the predicate data $P_g$, and the destination register information $Z_d$ if required. It also provides the ID information that is used to populate the ID field for each group within the MAB zone, and to identify the overall ID associated with the access operation, in this example it being assumed that the access operation is a load operation.

The alignment/hit logic 305 is used to access the data array 400 within the level 1 cache via a predetermined cache port width, which in this example is shown as being 128 bits. The retrieved data is aligned to the internal bus format used to route data from the alignment circuitry to the multi-axial buffer. In this particular example, it is assumed that Y and Z values are retrieved via the current access, and accordingly the write predicate information is set to "011" to identify that the two data elements in the currently retrieved data are Y and Z components to store into the second and third storage elements in a particular group, with the first storage element in the group not being updated. The identifier information associated with the access is used to determine the group into which the data is written.

Once all of the required groups within the MAB zone have been populated with data loaded from the memory, the relevant sets within the multi-axial buffer are drained to the vector register file 410. In this example, it is assumed that each data structure comprises three components, namely the X, Y and Z components, and accordingly there are three vectors to drain to corresponding vector registers within the vector register file 410. As discussed earlier, the multiplexer circuit 355 can be used to insert logic "0" values at any data element positions that are not of interest, as indicated by the predicate information.

Once the information has been drained to the register bank, the multi-axial buffer can issue a control signal (for example an "all done" control signal) to a commit stage 415 within the apparatus, at which point the load operation can be committed. Whilst the commit stage has not been shown in FIG. 1, it can logically be considered to be a shared stage between the various execution pipelines 30, 35, 40. In the example of an out of order processor, the commit stage 415 may be part of the functionality of the reorder buffer used to commit the load operation.

As also shown in FIG. 7, a direct bus path may be provided between the alignment/hit logic 305 and the vector register file 410, for use in situations where the multi-axial buffer is not being used, for example where a standard load operation is being performed to load data from memory into one of the registers of the register file 410.

As mentioned earlier, store operations operate in a similar, but reverse, fashion. First, a zone is allocated within the MAB, and secondly the content of N registers is then transferred into the MAB. Thereafter, the MAB is drained one column (group) per cycle, with the drained data then being transferred to a corresponding micro-operation within the store buffer of the LSU.

FIG. 8 is a diagram illustrating one example implementation of the MAB array, this example implementation supporting a single data element size (which in one embodiment may be 32-bits or in another embodiment may be 64-bits), a maximum of four data elements per vector register (i.e. VL=4), a maximum of three data elements per data structure (i.e. $N_{MAX}$=3) and with a maximum of 1 group of storage elements being accessed per cycle. Considering a load operation, the MAB operates as follows. The data elements corresponding to one data structure arrive on the input bus over the three paths 500, with the data structure identifier information being used to select the multiplexers associated with a particular group of storage elements in order to identify which group is updated. In the example shown in FIG. 8, the first group is formed by the data elements 450, 454, 458 accessed via associated multiplexers 452, 456, 459, a second group is formed by the storage elements 460, 464, 468 accessed by associated multiplexers 462, 466, 469, a third group is formed by the storage elements 470, 474, 478 accessed by the multiplexers 472, 476, 479, and a fourth group is formed by the storage elements 480, 484, 488 accessed by the multiplexers 482, 486, 489.

In addition to the data structure identifier used to identify the relevant group, any write predicate information provided in association with the data on the input bus can also be used to control the associated multiplexers, so that the data structure identifier in combination with any such write predicate information identifies which storage elements (which may for example be flip-flops) are updated. As discussed earlier, the data arriving from memory may be out of order, and in any particular cycle any one of the four above mentioned groups may be accessed, dependent on the data structure identifier.

Once all of the required data has been stored into the MAB, then the MAB can be drained in a first-in-first-out (FIFO) manner where data is output via the output bus lines 505. In this particular arrangement, the three vectors are drained in the order of X, Y and then Z, such that on the first cycle the contents of the four storage elements 450, 460, 470, 480 are output over the path 505, and at the same time the contents of the second and third rows of storage elements are moved upwards into the adjacent set of storage elements nearer the output buses 505 via the internal routing lines 510. Hence, in a second cycle the Y data elements can then be accessed (by virtue of them now residing in the storage elements 450, 460, 470, 480), and then finally in a third cycle the Z data elements can be accessed, by which time those data elements are stored in the storage elements 450, 460, 470, 480. By constraining the MAB to operate in this manner, this significantly reduces the complexity of the routing connections. It also ensures that there is no extra cycle of penalty imposed when only loading the X and Y data elements, since in that event the final output stage is not required, since the contents of the storage elements 458, 468, 478, 488 are not of interest.

In this example arrangement, when performing a store operation, the MAB is filled in a FIFO manner with the access lines 515 being arranged to route a vector of X data elements into the storage elements 458, 468, 478, 488. In the next cycle, the X data elements are pushed up into the storage elements 454, 464 474, 484 via the interconnecting wires 510 whilst the Y data elements are written into the storage elements 458, 468, 478, 488. During a third cycle, the Z data elements are stored into the storage elements 458, 468, 478, 488, with the X and Y data elements moving up one row via the interconnecting wires 510. Such an approach allows reuse of the drainage routing paths 510 provided for the load operation, so that they can be reused for inputting the vectors during the storage operation. If the store operation only concerns X and Y coordinates, then the final loading stage via the input path 515 loads data of a "don't care" state into the storage elements 458, 468, 478, 488.

In this example arrangement of FIG. 8, then during a store operation the groups of data structures are also drained in a FIFO manner via the output paths 520. The internal routing wires 530 ensure that as each data structure is drained from the left hand side, the data structures in adjacent columns move one column position to the left, so that over a series of cycles the contents of the entire MAB may be drained via the output paths 520. This again provides a simple structure for allowing the array of storage elements within the MAB to be used during such a store operation. The order shown in FIG. 8 for draining the data structures during a store operation has been found to work well, because it is often more likely for the later elements of a vector (i.e. the ones stored within the right hand side of FIG. 8) to be not needed (as flagged by the predicate information) rather than the earlier ones, and accordingly the performance has been found to be acceptable.

Accordingly, some of the key properties of such an arrangement are that during a load operation, the data structures retrieved from memory can arrive out of order and be stored within the MAB, and most of the data movement within the MAB occurs in a FIFO manner which allows simple routing circuitry (both in terms of low area and latency). Further, the routing delays within the MAB (that determine the maximum clock frequency that the MAB may be driven at) are independent of the vector length VL, hence providing potential performance benefits.

As mentioned earlier, with the arrangement of FIG. 8 it is assumed that the data will always be of the same size, for example 32-bit data elements or 64-bit data elements. However, in an alternative embodiment the MAB can be adapted so as to allow its use with different sized data elements, an example of such different sized data elements being shown in FIG. 9. FIG. 9 shows how different sized data elements are aligned on the input bus to the MAB. FIG. 10 illustrates an example arrangement for the MAB buffer array, assuming that the data is aligned on the input bus as per the arrangement shown in FIG. 9. All of the bus paths, multiplexers and flip-flops shown in FIG. 10 operate on a 32-bit granularity, and as per FIG. 9 if 64-bit data elements are being handled, then they are treated as two 32-bit sections, labelled as the low (L) and high (H) sections.

The arrangement of the storage elements and associated multiplexers is essentially the same as in FIG. 8, and in FIG. 10 those elements have accordingly been referred to by the same reference numerals. As shown on the left hand side of the figure, there are six input lines 600 via which the various input data elements can be forwarded. If dealing with 32-bit data elements, only the upper three input lines are used, whereas if dealing with 64-bit data elements all six input paths are used as shown. Hence, purely by way of example, when handling 32-bit data elements, the Y data element for the first group can be input via the multiplexer 456 into the storage element 454, or when handling 64-bit data elements the lower half of a 64-bit Y data element can also be routed in to the storage element 454 via the multiplexer 456 using the same input path 600 as would be used for the Z value for a 32-bit data element.

As with the example of FIG. 8, it will be appreciated that any group can be accessed independently, and accordingly the data can arrive out of order from the memory. In addition, the MAB is drained during a load operation in the same way as discussed earlier with reference to FIG. 8, this time via the four output paths 605, such that one set is drained per cycle, and the data elements from each set are moved upwards through the array via the interconnection paths 610.

Considering a store operation, then the MAB is filled in the same way as discussed earlier with reference to FIG. 8, via the various input paths 615 and interconnection paths 610. When dealing with 64-bit data elements, the first and third columns store the low half of 64-bit data elements, and the second and fourth columns store the high half of 64-bit data elements input other the paths 615.

When it comes to draining the structures shown, the MAB is again drained in a FIFO style manner, but for each row there are effectively two output paths 620, one used for the even numbered groups, and one used for the odd numbered groups, and in addition the various output multiplexers 640 are provided. For 32-bit data elements, during a first cycle an even numbered group is sent to the output bus via the relevant paths 620. Then, the corresponding output multiplexers 640 toggle so as to select a different input, allowing the data elements stored in an odd numbered group to be output via the relevant output paths 620. During this process, the storage element contents are shifted left by two groups, so that for example the contents in the storage element 470 are moved into the storage element 450 and the contents of the storage element 480 are moved into the storage element 460. In a third cycle, the output multiplexers again toggle, allowing output of the next group of data elements (which are now stored in the data elements 450, 454, 458), and then during the next cycle the multiplexer outputs toggle again to allow the final data elements to be output, which are now stored in the storage elements 460, 464, 468.

The above process is performed when 32-bit data elements are being handled, and hence the toggling between the inputs of the multiplexers 640 allows a series of data structures to be output over the three output paths from those multiplexers.

When handling 64-bit data elements, all six of the output paths shown on the left hand side of FIG. 10 are used, in connection with the data element portions as shown. When handling 64-bit data elements, it will be seen that by the shifting of the flip-flop contents left by two groups, so that the contents in the third group 470, 474, 478 are moved into the first group 450, 454, 458 when the initial contents of the first group's flip-flops are output, and then the contents in the fourth group 480, 484, 488 are shifted into the second group 460, 464, 468 when the original contents stored in the flip-flops of the second group are output, this enables one group of 64-bit elements to be output per cycle. In particular, the original contents of the group 450, 454, 458 and the group 460, 464, 468 can be output in a first cycle, and then in a second cycle the original contents in the two groups 470, 474, 478 and 480, 484, 488 (which by this time have been moved into the two left hand side groups via the forwarding paths 630) can then be output.

Accordingly, by using the approach shown in FIG. 10, the same storage requirements are necessary as with the single data type variant discussed earlier with reference to FIG. 8, and all buses and components operate on a 32-bit granularity, whilst supporting the ability to operate with not only 32-bit data elements, but also 64-bit data elements.

FIG. 11 shows a yet further example arrangement of the MAB array and associated routing circuitry, which differs from the example shown in FIG. 10 in that the required data movements are performed using multiplexers rather than employing a FIFO style arrangement. In particular, during a load operation the data is provided on the input paths 700 and routed via the required multiplexers into the inputs of the various storage elements. As can be seen, any group can be accessed independently. Then, with regards to the load drain paths 705, each of the drain paths has associated multiplexing circuitry 710 and corresponding routing paths, allowing any of the sets to be accessed independently, and hence allowing the sets to be drained in any order. Further, considering a store operation, the vectors provided on the input paths 715 can be routed via the illustrated paths and input multiplexers to the storage elements so as to enable the vectors to be input in any order into the associated set of storage elements. Further, with regards to the store output paths 720 used to output the data structures to the load store unit for storing in the memory, again associated multiplexers 730 and corresponding routing paths are provided in order to enable the groups to be accessed in any order. By such an approach, any undesired groups of storage elements, as indicated for example by the earlier mentioned predicate information, can be skipped.

Whilst such an approach increases complexity (potentially in terms of area and latency), it also reduces the number of gates activated during data transfers, and therefore can improve the efficiency of clock gating. It should further be noted that whilst in the example shown in FIG. 11 the various multiplexers 730 provided on the output path for a store operation are shown as a sequence of separate multiplexers for each row, that sequence/chain of multiplexers could instead be consolidated into one wide multiplexer for each 32-bit output connector over a corresponding output path 720.

In the example implementations discussed above, it has been assumed that certain characteristics of the system, such as the offset between the various data structures in memory, the potential misalignment of such data structures, and the cache port width (which in one example is 128-bits) would limit the results obtained from most cache accesses to the data elements of only one data structure. For example, a 128-bit access would usually only return one data structure of 32-bit sized data elements, and only a partial data structure of 64-bit data elements. However, certain data structures may exhibit offsets between adjacent data structures small enough to allow more than one data structure to be fetched per cache access. This becomes even more likely when the cache access window is increased to 256-bits, for example by utilizing two adjacent cache ports for memory accesses.

The filling scheme shown in the example of FIG. 12 attempts to exploit this possibility by servicing up to two data structures per cycle. It assumes that two adjacent data structures loaded in such a cycle correspond to one even and one odd indexed data structure. Further, it assumes that both data structures are desired (i.e. the associated predicates are equal to one). As shown in FIG. 12, the data elements of one data structure can be routed over the input paths 800 into either the first or third groups of storage elements, whilst simultaneously the data elements of a separate data structure may be routed over the input paths 802 to the second or fourth groups of storage elements. In this example, it is assumed that the drain path is as discussed earlier with reference to the example of FIG. 10, and accordingly one vector of storage elements is drained over the output paths 805 per cycle, with the vectors moving upwards through the array of storage structures via the interconnecting paths 810. For simplicity, the routing provided for store operations is omitted, but a dual-ported drain path could be provided if desired, to enable two data structures stored in adjacent groups to be drained to the load store buffer in the same cycle, for output to memory. However, in many instances, stores are less performance critical in comparison to loads, and as a result the complexity introduced by such an approach may be unjustified for store operations.

FIG. 13 illustrates an example of how four data structures containing two 32-bit data elements each may be fetched using a 128-bit wide cache access window and then aligned to the input bus. Note that the interleaving of even and odd 32-bit data elements allows the circuitry in FIG. 12 to reuse the input connections for the low/high part of 64-bit data elements for even/odd 32-bit data elements, without the need for dedicated routing or multiplexing. Hence, the additional circuitry introduced into the alignment stage to perform the alignments shown in FIG. 13 is offset by the reduced complexity of the MAB.

Hence, in the example illustrated in FIG. 13, the MAB is filled with data arriving from memory, and the data structures may as before arrive out of order. Data corresponding to even/odd data structures will be input over the corresponding input connectors 800, 802, respectively. Two sets of write predicates are provided, specific to the even and odd data structures, and the identifiers of the underlying data structures are used to determine which flip-flops are updated. The drainage scheme used for the load operation is then as discussed earlier with reference to FIG. 10.

Whilst in one embodiment, this could potentially enable two data structures of 32-bit data elements to be simultaneously processed with an arbitrary offset between the two data structures, allowing for such arbitrary offset could significantly increase the complexity of the alignment circuitry. Accordingly, in one embodiment, to limit this complexity, the number of simultaneously processed data structures of 32-bit data elements may be limited to two, with their offset being limited to zero.

FIG. 14A illustrates the utilization of a pipeline to process a load operation of the above described type. During the decode pipeline stage, the required load operation is determined by decoding one or more instructions used to specify the load operation, the required MAB zone is allocated, the predicate information is identified, and the destination registers are specified (in some embodiments as mentioned earlier the destination registers may be held elsewhere, rather than in association with the allocated MAB zone). In addition, the IDs for various data structures are identified and associated with the various groups within the MAB. During the level 1 data access stage, a data access is initiated for the data structure associated with the relevant data structure identifier, and when the data is retrieved, then at the alignment/hit logic stage the retrieved data is aligned to the result bus, and write predicate information set as required. During the StructLoad buffer stage, the identified column within the MAB (i.e. the column associated with the relevant data structure identifier) is written to with the data provided on the bus, with the write predicate information being referred to in order to identify which storage elements to update.

As shown in FIG. 14A, these various pipeline stages are repeated for each of the data structure identifiers (excluding any that are marked as not needed via the predicate information $P_g$). Once all of the required data structures are stored in the MAB, then the MAB drain pipeline stage is implemented. For each destination register, this causes a row within the MAB to be output to that destination register, with logic "0" values being inserted for any data element positions associated with inactive columns. Thereafter, the process ends with the commit stage, where the load operation is committed, at which point the MAB zone is released for use in connection with another load or store operation.

In one embodiment, whilst at least the first data structure identified in the load operation is loaded non-speculatively, one or more of the later data structures being loaded may be being loaded speculatively. Accordingly, since in this case the MAB will include speculative state, at the commit stage the process needs to wait until all of the relevant micro-operations have been performed before performing the commit operation.

In one embodiment, as illustrated in FIG. 14B, on the occurrence of a fault during a load access, it is determined whether the data structure being accessed at that point is due to a non-speculative access or a speculative access. If it is due to a non-speculative access, then the fault may cause a generation of an exception to handle that fault. However, if the fault occurs in relation to a speculative access, then in one embodiment no exception is taken, and instead the presence of the fault in the speculative access is used to update the predicate information to mark as inactive the group associated with the speculative access, and all subsequent groups (which will also relate to speculative accesses). However, the process can continue to populate the MAB buffer for any groups that are active and associated with non-speculative (and indeed other speculative) load accesses earlier in the sequence than the load access that gave rise to the detected speculative fault.

Hence, in the example shown in FIG. 14B, it is assumed that the non-speculative access associated with the identifier $ID_0$ operates as before, and does not produce any fault. However, it is assumed that the access associated with the identifier $ID_1$ is a speculative access, and that a fault is detected during the level 1 data access. During the alignment/hit stage, the data is ignored, and then at the Struct-Load buffer stage, no data is written into the relevant group within the MAB, but instead the predicate storage is updated to set to zero the predicate information associated with the current access, and all subsequent accesses. Based on the modified predicate information, any active lanes will have the data loaded from memory, and then when the data for all of the active lanes is received, the MAB drain stage and commit stages can be implemented as before.

This fault handling behaviour for speculative accesses is illustrated schematically in FIG. 15. As shown by the block 900, the initial predicate information is "1101". As shown by the block 910, during a first load access, the X and Y components for the first group are loaded from memory and stored within the first group of the MAB. It is then assumed that the next load data received is that associated with the fourth column, and given that the predicate is active that information is stored within that column, as indicated by the block 915. It should be noted that the load of the X, Y coordinates $X_3$, $Y_3$ relates to a speculative access, but as no fault has occurred that information is loaded and stored within the MAB buffer.

However, it is then assumed that when the data for the second group is loaded, namely the coordinates $X_1$, $Y_1$, a fault is detected. However, since that access relates to a speculative access, no exception is taken and instead when the MAB is updated, no X, Y data is added to the buffer, and instead the predicate data is updated to set to zero the predicate for the current group, and also to set to zero the predicate for all of the subsequent groups, as shown by block 920. Accordingly, at this point it can be seen that the only remaining active group is the first group, and that the data for that group has already been obtained. Accordingly the process can then proceed to the MAB drain and commit stages, at which point only the values $X_0$ and $Y_0$ will be written into the relevant destination vector registers.

By such an approach, it is possible to gain the performance benefits of performing speculative load and store operations. However, where such speculative load operations give rise to faults being detected, there is no need to take an exception at that point, which could impact performance, and instead the load operation is completed for any of the data structures prior to the speculative data structure giving rise to the fault. It may be that when the data structure that gave rise to the fault is attempted to be loaded again at a later point, no such fault arises, due for example to the fact that the correct page is stored in memory at that later time, and accordingly no fault occurs when seeking to load the data. Hence, by avoiding taking exceptions for faults associated with speculative load accesses, significant performance benefits can be realised.

In the above described embodiments where predicate information is used to identify any non-desired groups, then in one embodiment it is described that a zeroing circuit is used to insert logic "0" values at any data element positions associated with a logic "0" predicate. In an alternative embodiment, a merging process may be performed, where the current contents of the vector register are first read, and then a merge operation is performed to update the register contents with the contents stored in any active lane of the relevant set within the MAB. In this embodiment, instead of adding a logic "0" value in any data element position associated with a logic "0" predicate, instead the pre-existing data element stored in that vector register at that data element position is retained.

It has been found that the above described embodiments provide a particularly efficient mechanism for handling gather and/or scatter operations performed in relation to data structures consisting of one or more data elements.

The technique of the above described embodiments can significantly improve the performance of loading data structures from, and storing data structures to, memory. It can also give rise to potential energy savings, for example by reducing dynamic energy consumption due to the reduced number of micro-operations, cache accesses and register accesses required. It may also lead to reductions in the size of the issue queue and load-store queue required, which would yield some reductions in static power.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:
1. An apparatus, comprising:
first interface circuitry to receive data structures retrieved from memory, each data structure having an associated identifier and comprising N data elements;

multi-axial buffer circuitry having an array of storage elements, along a first axis the array being organised as N sets of storage elements, each set containing a plurality VL of storage elements, and along a second axis the array being organised as groups of N storage elements, each group containing a storage element from each of the N sets;

access control circuitry to store the N data elements of a received data structure in one of said groups selected in dependence on the associated identifier; and second interface circuitry, responsive to an indication that required data structures have been stored in the multi-axial buffer circuitry, to output the data elements stored in one or more of the sets of storage elements as one or more corresponding vectors of data elements for storage in a register bank, each vector containing VL data elements.

2. An apparatus as claimed in claim 1, wherein N is an integer of 2 or more.

3. An apparatus as claimed in claim 1, wherein one or more of the required data structures are stored in memory at non-contiguous addresses with respect to others of the required data structures.

4. An apparatus as claimed in claim 1, wherein the access control circuitry is further arranged to re-use the multi-axial buffer circuitry during performance of a store operation to store N vectors of data elements from the register bank to memory as a plurality of data structures that each comprise N data elements, the access control circuitry causing the multi-axial buffer to be accessed to store each vector of data elements received via the second interface from the register bank in an associated set of storage elements along the first axis, and causing one or more data structures to be retrieved from one or more associated groups of storage elements along the second axis for output via the first interface circuitry to the memory.

5. An apparatus as claimed in claim 1, further comprising predicate storage to store, in association with each group of storage elements along the second axis, a predicate value indicating whether the associated group of storage elements is active or inactive, and the required data structures are those associated with an active group of storage elements.

6. An apparatus as claimed in claim 5, wherein the first interface circuitry is arranged to suppress retrieval from the memory of data structures associated with an inactive group of storage elements.

7. An apparatus as claimed in claim 5, wherein:

the access control circuitry is further arranged to re-use the multi-axial buffer circuitry during performance of a store operation to store N vectors of data elements from the register bank to memory as a plurality of data structures that each comprise N data elements, the access control circuitry causing the multi-axial buffer to be accessed to store each vector of data elements received via the second interface from the register bank in an associated set of storage elements along the first axis, and causing one or more data structures to be retrieved from one or more associated groups of storage elements along the second axis for output via the first interface circuitry to the memory; and during the store operation the first interface circuitry is arranged to suppress output to the memory of the data structure associated with any inactive group of storage elements.

8. An apparatus as claimed in claim 5, wherein the second interface circuitry comprises insertion circuitry to insert, when outputting the vector of data elements for storage in the register bank, a predetermined data value in each data element position within the vector of data elements that is associated with an inactive group of storage elements.

9. An apparatus as claimed in claim 8, wherein the predetermined value is a logic zero value.

10. An apparatus as claimed in claim 1, wherein the first interface circuitry comprises alignment circuitry to align the data elements of a data structure retrieved from the memory with an internal bus format.

11. An apparatus as claimed in claim 10, further comprising a write predicate field associated with the internal bus format to identify which data elements on the internal bus are required to be stored in the multi-axial buffer circuitry.

12. An apparatus as claimed in claim 1, further comprising:

allocation circuitry to allocate the associated identifiers of the data structures to corresponding groups of storage elements within the array, for use by the access control circuitry when determining into which group to store the N data elements of a received data structure.

13. An apparatus as claimed in claim 5, further comprising:

allocation circuitry to allocate the associated identifiers of the data structures to corresponding groups of storage elements within the array, for use by the access control circuitry when determining into which group to store the N data elements of a received data structure;

wherein the allocation circuitry is further arranged to determine the predicate values to store in the predicate storage.

14. An apparatus as claimed in claim 12, wherein the allocation circuitry is further arranged to specify the array of storage elements within the multi-axial buffer circuitry, the multi-axial buffer circuitry having sufficient storage elements to enable more than one array of storage elements to be specified, and the access control circuitry is arranged to control use of the multi-axial buffer circuitry to enable multiple access operations to be processed in parallel using different arrays of storage elements within the multi-axial buffer circuitry.

15. An apparatus as claimed in claim 14, wherein the allocation circuitry is arranged to release the array of storage elements for use in connection with another access operation once the data elements stored in each set of storage elements have been output as a corresponding vector of data elements for storage in the register bank.

16. An apparatus as claimed in claim 12, wherein the allocation circuitry is provided within decode circuitry used to produce a series of micro-operations to implement a load operation to transfer a plurality of data structures from memory into one or more vectors of data elements stored in the register bank.

17. An apparatus as claimed in claim 1, further comprising decode circuitry to produce a series of micro-operations to implement a load operation to transfer a plurality of data structures from memory into one or more vectors of data elements stored in the register bank, the associated identifier for each data structure being derived from micro-operation identifiers generated by the decode circuitry.

18. An apparatus as claimed in claim 1, further comprising routing circuitry within the multi-axial buffer circuitry to enable the groups of storage elements to be updated in any order.

19. An apparatus as claimed in claim 18, wherein the routing circuitry provides a drain path to enable each set of storage elements to be accessed serially when outputting each vector of data elements for storage in the register bank.

20. An apparatus as claimed in claim 19, wherein:

the access control circuitry is further arranged to re-use the multi-axial buffer circuitry during performance of a store operation to store N vectors of data elements from the register bank to memory as a plurality of data structures that each comprise N data elements, the access control circuitry causing the multi-axial buffer to be accessed to store each vector of data elements received via the second interface from the register bank in an associated set of storage elements along the first axis, and causing one or more data structures to be retrieved from one or more associated groups of storage elements along the second axis for output via the first interface circuitry to the memory; and wherein the drain path is reused during the store operation to serially store each vector of data elements received via the second interface from the register bank in an associated set of storage elements along the first axis.

21. An apparatus as claimed in claim 18, wherein the routing circuitry includes multiplexing circuitry to enable each set of storage elements to be accessed in any order.

22. An apparatus as claimed in claim 18, wherein the routing circuitry is arranged such that the access control circuitry uses the same array of storage elements within the multi-axial buffer circuitry, irrespective of whether the data elements being processed are of a first size or at least one further size different to said first size.

23. An apparatus as claimed in claim 18, wherein the routing circuitry comprises a plurality of ports to enable multiple of the groups of storage elements to be updated at the same time.

24. An apparatus as claimed in claim 5, wherein a load operation is performed to transfer a plurality of data structures from the memory into one or more vectors of data elements stored in the register bank, one or more of the data structures in said plurality being retrieved speculatively, and on detection of a fault during the speculative retrieval of one of said one or more data structures from memory, the predicate storage is updated to mark the group of storage elements associated with that data structure, and all subsequent groups of storage elements within the array, as inactive.

25. A method of transferring a plurality of data structures from memory into one or more vectors of data elements stored in a register bank, comprising:

retrieving the data structures from the memory, each data structure having an associated identifier and comprising N data elements;

providing an array of storage elements within a buffer, along a first axis the array being organised as N sets of storage elements, each set containing a plurality VL of storage elements, and along a second axis the array being organised as groups of N storage elements, each group containing a storage element from each of the N sets;

storing the N data elements of each retrieved data structure in one of said groups selected in dependence on the associated identifier; and responsive to an indication that required data structures have been stored in the buffer, outputting the data elements stored in one or more of the sets of storage elements as one or more corresponding vectors of data elements for storage in the register bank, each vector containing VL data elements.

26. An apparatus, comprising:

first interface means for receiving data structures retrieved from memory, each data structure having an associated identifier and comprising N data elements;

multi-axial buffer means having an array of storage element means, along a first axis the array being organised as N sets of storage element means, each set containing a plurality VL of storage element means, and along a second axis the array being organised as groups of N storage element means, each group containing a storage element means from each of the N sets;

access control means for storing the N data elements of a received data structure in one of said groups selected in dependence on the associated identifier; and second interface means for outputting, responsive to an indication that required data structures have been stored in the multi-axial buffer means, the data elements stored in one or more of the sets of storage element means as one or more corresponding vectors of data elements for storage in a register bank means, each vector containing VL data elements.

* * * * *